United States Patent
Schumacher

(10) Patent No.: US 10,080,959 B2
(45) Date of Patent: Sep. 25, 2018

(54) VIDEO GAME INCORPORATING SAFE LIVE-ACTION COMBAT

(71) Applicant: Dean Schumacher, West Bloomfield, MI (US)

(72) Inventor: Dean Schumacher, West Bloomfield, MI (US)

(*) Notice: Subject to any disclaimer, the term of this patent is extended or adjusted under 35 U.S.C. 154(b) by 0 days.

(21) Appl. No.: 15/346,451

(22) Filed: Nov. 8, 2016

(65) Prior Publication Data
US 2017/0120144 A1    May 4, 2017

Related U.S. Application Data

(63) Continuation of application No. 14/249,988, filed on Apr. 10, 2014, now Pat. No. 9,486,700.

(51) Int. Cl.
| | |
|---|---|
| A63F 9/24 | (2006.01) |
| A63F 13/00 | (2014.01) |
| G06F 17/00 | (2006.01) |
| G06F 19/00 | (2018.01) |
| A63F 13/24 | (2014.01) |
| A63F 13/25 | (2014.01) |
| A63F 13/35 | (2014.01) |
| A63F 13/213 | (2014.01) |
| A63F 13/837 | (2014.01) |

(52) U.S. Cl.
CPC ............ *A63F 13/24* (2014.09); *A63F 13/213* (2014.09); *A63F 13/25* (2014.09); *A63F 13/35* (2014.09); *A63F 13/837* (2014.09); *A63F 2300/8076* (2013.01)

(58) Field of Classification Search
CPC ........................................ A63F 9/24
USPC .............................................. 463/7
See application file for complete search history.

(56) References Cited

U.S. PATENT DOCUMENTS

| | | | | |
|---|---|---|---|---|
| 5,649,706 A | * | 7/1997 | Treat, Jr. ................ | F41J 9/14 273/358 |
| 2004/0157664 A1 | * | 8/2004 | Link ...................... | A63F 13/10 463/43 |

* cited by examiner

*Primary Examiner* — Kevin Y Kim
(74) *Attorney, Agent, or Firm* — Greenberg Traurig, LLP

(57) ABSTRACT

Video games can be improved upon by combining traditional gameplay mechanics (e.g., a player's use of a controller) and live-action combat elements that may be measured and scored. For example, a player may fire projectiles at a target when prompted by a game, may have to dodge projectiles fired at the player as part of the game, may have to traverse the room to touch or move an object, and/or may have to strike a dummy or other object as instructed by the game. Such live-action combat aspects may be incorporated into a video game having otherwise traditional gameplay mechanics.

20 Claims, 12 Drawing Sheets

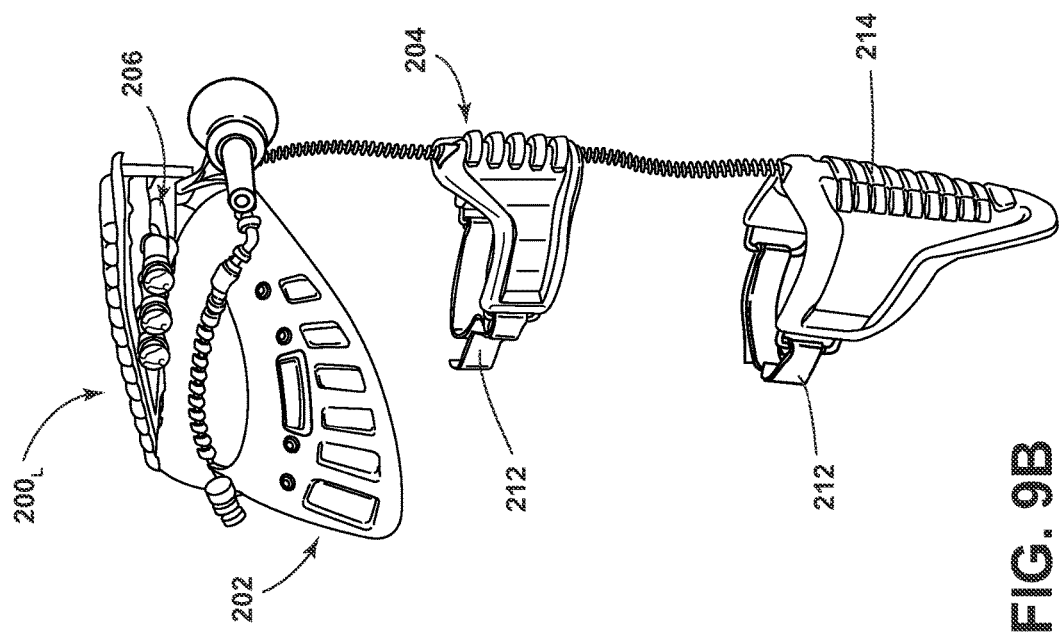
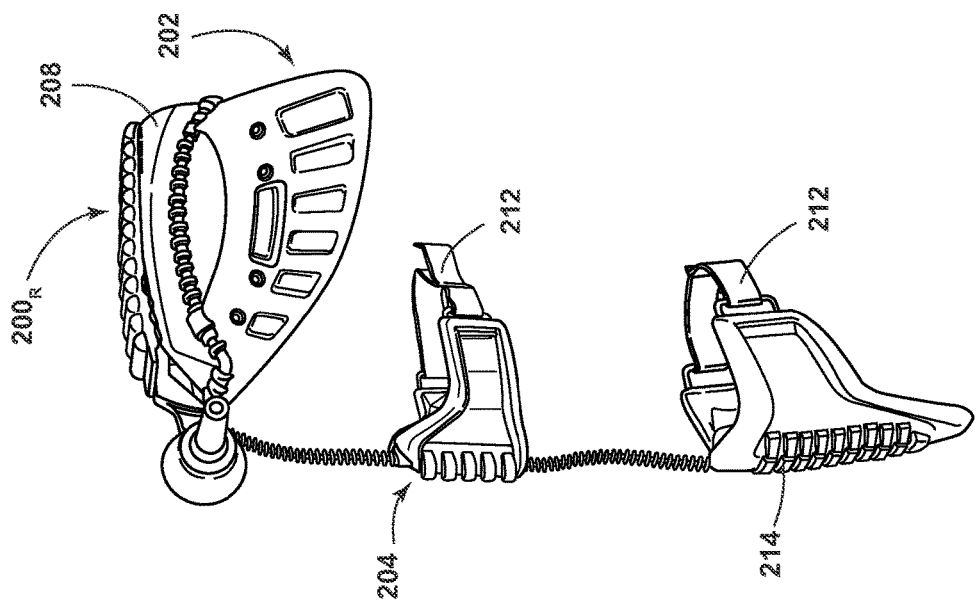

VIDEO GAME INCORPORATING SAFE LIVE-ACTION COMBAT

BACKGROUND a. Technical Field

The present disclosure relates to video games, including video games incorporating safe live-action combat.

b. Background Art

Video games, since their emergence into widespread commercialization in the 1970s and 1980s, have continued to grow in popularity and complexity. A wide range of games are and have been published, including sports games, combat games, fantasy games, and numerous other game types. Even as games have become more and more advanced, however, the paradigm of interaction between the player and the game has generally stayed the same for the vast majority of games: the player uses a handheld controller or similar device to direct action on a display.

Various video games have attempted to change or supplement the user's interaction with the game. For example, some games may involve a surface (e.g., a pad, mat, or platform) on which a player touches his or her feet, hands, etc. to match prompts on screen (in, for example, dance games) or to direct action on screen (in, for example, track-and-field games). In another example, some games attempt to measure the player's movement, either directly (e.g., by recording that movement with a camera) or indirectly (e.g., through gyroscopes in a controller or other device).

BRIEF SUMMARY

Efforts to alter the basic interaction between a user and a video game have generally either been directed to game types that have, at best, only niche or relatively fleeting popularity or have been generally unsuccessful at requiring the player to be active during the game. For example, even a game that includes gyroscopic tracking of a controller that is intended to cause a player to move to play the game can generally be played by a sedentary player making small movements of the controller. As a result, video games have not effectively incorporated player movement into games in a sustainably successful way.

Video games can be improved upon by combining traditional gameplay mechanics (e.g., a player's use of a controller or similar device) and safe live-action combat elements. For example, a player may fire projectiles at a target when prompted by a game, may have to dodge projectiles fired at the player as part of the game, may have to traverse the room to touch or move an object, and/or may have to strike a dummy or other object as instructed by the game. Such live-action combat aspects may be incorporated into a video game having otherwise traditional gameplay mechanics.

An exemplary embodiment of a video game incorporating live-action combat may be embodied on a non-transitory computer-readable memory storing instructions, the instructions embodying a method. The method may comprise displaying a game on a display for a user, receiving information regarding a physical projectile caused to be propelled by the user, and providing feedback on the display to the user regarding the projectile, wherein the game comprises a graphical display of one or more moving objects other than the projectile. Additionally or alternatively, the method may comprise displaying a game on a display for a user, prompting the user to strike a physical target, receiving information from the target regarding a strike at the target, and providing feedback on the display to the user regarding the strike.

An exemplary embodiment of a video game incorporating live-action combat may additionally or alternatively be embodied in a system comprising a target configured to be placed near a user and software configured to be executed by a video game computing system. When executed, the software may provide a video game on a display for a user, wherein the display is different from the target, prompt the user to strike the target, wherein the target is separate from the display, receive information regarding an attempted strike by the user at the target, and provide feedback to the user regarding the attempted strike.

BRIEF DESCRIPTION OF THE DRAWINGS

FIG. 9A is an isometric view of an embodiment of a first right shoulder apparatus that may be worn by a user for a video game incorporating live-action combat.

FIG. 9B is an isometric view of an embodiment of a first left shoulder apparatus that may be worn by a user for a video game incorporating live-action combat.

DETAILED DESCRIPTION

Figure 1:
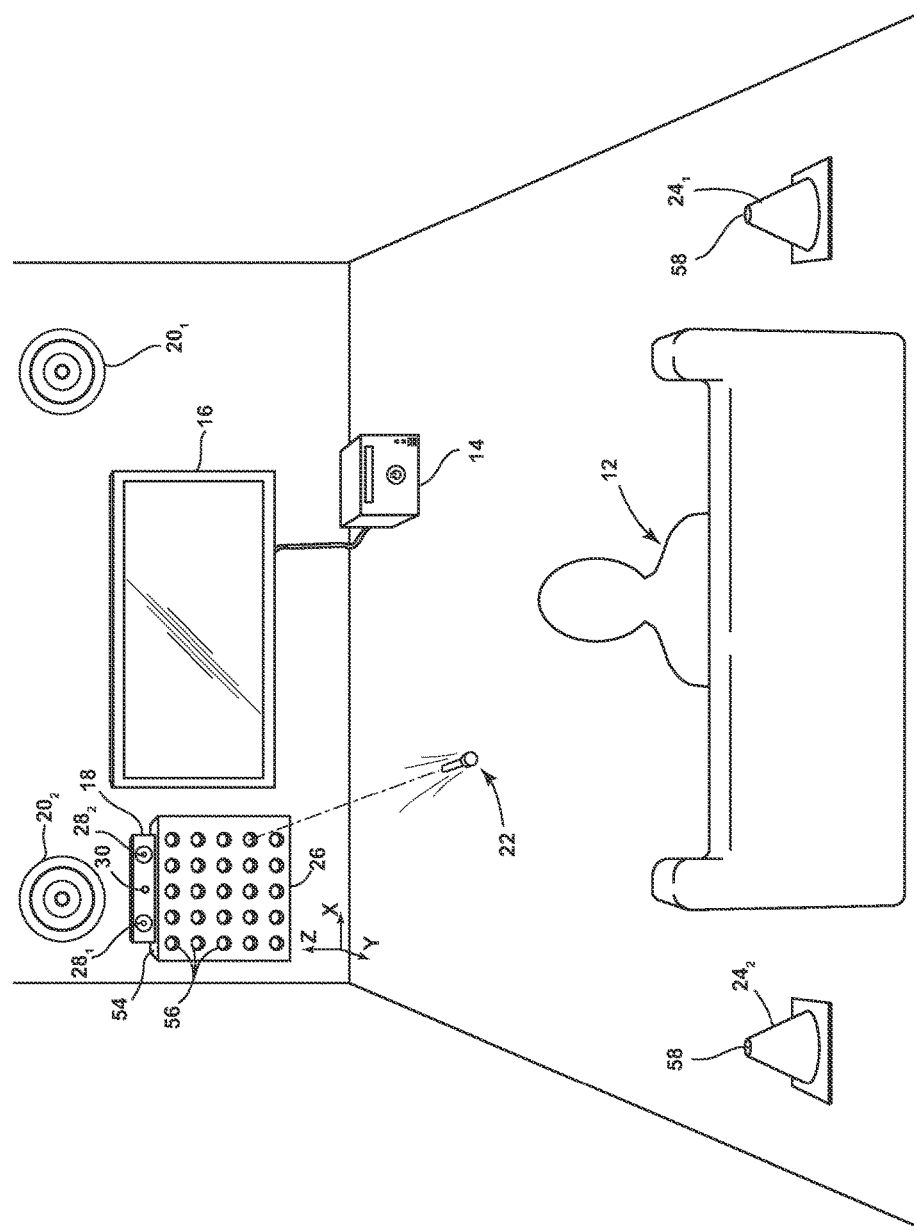
FIG. 1 is a diagrammatic perspective view of portions of an exemplary embodiment of a system for a video game incorporating live-action combat.

Referring to the drawings, wherein like reference numerals refer to the same or similar features in the various views, FIG. 1 is a diagrammatic perspective view of a portion of a system 10 for a video game incorporating safe live-action combat that may be played by a user 12. The system 10 may include a video game system 14, a display 16, a camera 18, one or more projectile targets 20 (with two such projectile targets $20_1$, $20_2$ shown), one or more projectiles 22, one or more movement targets 24 (with two such movement targets $24_1$, $24_2$ shown), and an automated projectile apparatus 26. The system 10 may be configured to operate a game including elements of display-centric gameplay and elements of live-action combat. An exemplary embodiment of the system 10 and its various components will first be described, followed by a description of exemplary gameplay elements that may be provided according to the present disclosure.

System Overview.

The system 10 (and other devices and apparatus discussed in this disclosure) may be used to provide one or more video games. Such video games may include, for example, elements of traditional video games (e.g., directing action on the display with a handheld controller or similar device) and elements of live-action combat. Such video games may be provided in a private environment (e.g., a home) and/or in a public environment (e.g., an arcade, a restaurant). This disclosure may generically refer to "a game" or "the game"; such references should be understood to refer to any game which includes devices or gameplay elements illustrated in, described in, referenced in, and/or enabled by this disclosure. Accordingly, references to "a game" or "the game" should be understood to be for ease of description only, and do not specify a particular game unless so explicitly stated.

The video game system 14 may be or may include a suitable presently-available or hereafter-developed video game system configured for use with a wide variety of games, such as a MICROSOFT XBOX 360, MICROSOFT XBOX ONE, SONY PLAYSTATION 3, SONY PLAYSTATION 4, NINTENDO WII, or another video game system. Additionally or alternatively, the video game system 14 may be or may include a video game system designed for a more limited use (e.g., a single game or small set of games), including use with a video game incorporating live-action combat as illustrated and described herein. Additionally or alternatively, the video game system 14 may be or may include a suitable general purpose computer configured for video games and for other applications.

The display 16 may be or may include any type of suitable display, including a liquid-crystal display (LCD), light-emitting diode (LED) display, organic LED (OLED) display cathode-ray tube (CRT) display, and/or another type of display currently known or hereafter developed. A single display 16 may be used, in an embodiment, or multiple displays 16 may be used, in another embodiment.

The display 16 may incorporate touch capabilities, in an embodiment. Many different "touch screens" technologies may find use with this disclosure, including resistive touch screens, surface acoustic wave (SAW) touch screen, capacitive touch screens, projected capacitance-type (PCT) touch screens, strain gauge touch screens, optical imaging touch screens, dispersive signal technology (DST) touch screens, acoustic pulse recognition (APR) touch screens, and/or other touch screen types.

The camera 18 may be or may include one or more image detection devices configured to detect an image of or otherwise track one or more users and/or one or more additional objects. The camera 18 may be disposed on or integrated into the automated projectile apparatus 54 or the display 16, or may be or may include devices and components physically separate from the other devices and components in the system 10. The camera 18 may capture images according to light from any portion of the electromagnetic spectrum, in embodiments. For example, the camera 18 may be configured to image one or both of visible light and infrared light, in an embodiment. The camera 18 may comprise multiple lenses and/or imaging capture devices, in an embodiment. For example, the camera may comprise a first image capture device $28_1$, a second image capture device $28_2$, and a range device 30. One or both of the first image capture device $28_1$ and the second image capture device $28_2$ may capture images in the visible light spectrum, and one or both of the first image capture device $28_1$ and the second image capture device $28_2$ may capture images in the infrared light spectrum. The range device 30 may determine the distance from one or more objects to the camera 18. For example, the range device 30 may project and receive one or more lasers to determine distances between the camera 18 and one or more users and/or one or more other objects.

The camera 18 may be in electronic communication with the video game system 14, in an embodiment. As a result, a video game or other application executing on the video game system 14 may have access to image data, distance data, and/or other data from the camera 18. Accordingly, the video game system 14 may be able to determine the location of the user 12, movements of the user 12, and the location and movement of other objects, such as projectiles 22 and/or targets 20, 24, for example.

The system 10 may be configured to enable video game play that includes propelling of physical projectiles 22 as part of the game. For example, a game according to the present disclosure may include gameplay elements of a user 12 controlling action on the display 16 and more active gameplay elements of a user 12 propelling physical projectiles 22 at one or more targets (e.g., projectile targets 20), manually striking one or more objects, and/or dodging one or more physical projectiles 22 propelled at the user. Accordingly, the system 10 may include devices and programming directed to such live-action combat gameplay elements, in an embodiment.

The system 10 may include one or more physical projectiles 22. Projectiles 22 may be propelled by the user 12, in an embodiment, and/or at the user 12, in an embodiment, both of which are described in further detail below. Projectiles 22 may include physical projectiles such as darts, balls, disks, and the like. Physical projectiles 22 may have a tangible, consistent form, in an embodiment (i.e., distinguishing physical projectiles from water or a laser, for example). One or more of the projectiles 22 used in the system may comprise one or more materials including foam, rubber, plastic, and other materials including, but not limited to, materials that cause little or no damage when making contact with other objects.

One or more of the projectiles 22 may include features for tracking the projectile 22. For example, a projectile 22 may include a visible tag, such as a visible light reflector, infrared reflector/tag, or other visible tag. Additionally or alternatively, a projectile 22 may include a radio frequency identification (RFID) chip, a global positioning system (GPS) antenna, a digital gyroscope, and/or another chip, antenna, or sensor that may be used to determine the position and/or movement of the projectile 22. Additionally or alternatively, a projectile 22 may include a pressure sensor, gyroscope chip, optical sensor, capacitive surface or element, and/or another chip or sensor that may be used to determine an impact (e.g., force thereof) of the projectile 22 with an object. Such features for tracking the projectile 22 may be used, for example only and as described further below, for tracking a projectile 22 to, e.g., determine the accuracy and distance travelled of a projectile propelled by a user 12 or at a user 12, the response time of a user 12 to fire a projectile following a prompt, etc.

In an embodiment, a projectile 22 may be in electronic communication with the video game system 14, with a projectile target 20, with a camera 18, etc. The projectile 22 may transmit data from a sensor, antenna, chip, etc. that may be used for tracking the projectile 22.

Figure 2:
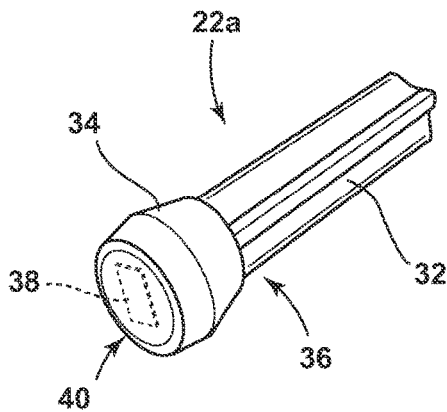
FIG. 2 is an isometric view of an exemplary embodiment of a dart-style projectile that may be used in a video game incorporating live-action combat.

FIG. 2 is an isometric view of an exemplary embodiment of a dart-style projectile 22a that may be used in the system 10. The projectile 22a may include a foam body 32, a rubber head 34 disposed on the anterior end 36 of the body 32 (i.e., where "anterior" refers to the direction in which the projectile 22a is intended to be propelled), and a tag/sensor/antenna 38 on an anterior surface 40 of the head 34. The tag/sensor/antenna 38 may be or may include, for example, a visible light reflector, an infrared light reflector, and/or another type of tag. The tag/sensor/antenna 38 may additionally or alternatively be or include another type of sensor or device to enable tracking the projectile 22a. Furthermore, in addition to or instead of a tag/sensor/antenna 38 on a surface of the projectile 22a, a tag/sensor/antenna 38 may be embedded in the projectile 22a.

Referring again to FIG. 1, the projectile targets 20 may be provided as targets at which the user may propel projectiles 22. A single projectile target 20 may be provided in the system 10, in an embodiment. In another embodiment, two or more projectile targets 20 may be provided.

A projectile target 20 may comprise a shape, size, and materials suitable for a single strike by a projectile 22, or for repeated strikes by one or more projectiles 22. For example, but without limitation, a projectile target 20 may comprise plastic, rubber, foam, metal, and/or another material, and may have a size on the order of a few inches up to a few feet. In an embodiment, as illustrated in FIG. 1, a projectile target 20 may have a "bullseye" configuration of multiple concentric rings. Additionally or alternatively, a projectile target 20 may include a portion having some other shape and/or appearance.

A projectile target 20 may include features for tracking a projectile 22 fired at the projectile target 20. For example, a projectile target 20 may include one or more pressure sensors, one or more optical sensors, one or more lasers, and/or one or more other sensors for detecting an impact or presence of a projectile 22 or other object, in an embodiment. Additionally or alternatively, a projectile target 20 may include a sensor configured to detect a feature of a projectile 22. For example, a projectile target 20 may include an RFID reader, a capacitive touch surface, and/or one or more readers, sensors, or other devices configured to operate in conjunction with a tracking feature of a projectile 22.

Each projectile target 20 may be in electronic communication with the video game system 14, with the camera 18, with the automated projectile apparatus 26, and/or with another portion of the system 10. As a result, a projectile target 20 may track one or more projectiles 22 and report tracking information to another device in the system 10 such as, but not limited to, the video game system 14, the automated projectile apparatus 26, etc.

In an embodiment, multiple devices in the system 10 may be involved in tracking projectiles 22. For example, the camera 18 may be configured to capture images of projectiles 22 and/or one or more portions of projectiles 22, such as a visible light reflector and/or infrared reflector. Additionally or alternatively, the video game system 14, a projectile target 20, and/or other device in the system 10 may receive other data related to tracking a projectile 22. For example, a projectile 22 may transmit GPS data, gyroscope data, pressure sensor data, optical sensor data, and/or other data derived from a sensor or device on or in the projectile 22, and the video game system 14, projectile target 20, and/or other device in the system 10 may receive and use such data (e.g., in conjunction with other data) to track the projectile 22.

Projectile tracking information may be used, in an embodiment and for example only, to determine the accuracy of a projectile 22 with respect to a projectile target 20, to determine the speed with which a user 12 propels a projectile 22 responsive to a prompt (i.e., the user's reaction time), to determine the distance travelled by a projectile 22, and/or to determine if a projectile 22 impacts a user 12. Additionally or alternatively, projectile tracking information may be used to assist a user 12 in finding projectiles 22 that have been propelled in the course of game play.

As noted above and below, a user 12 may propel one or more projectiles 22 at one or more projectile targets 20, in an embodiment. In an embodiment, a user 12 may propel a projectile 22 under his or her own force (e.g., throw or kick a projectile). Additionally or alternatively, a user 12 may propel a projectile 22 from a "gun" or other projectile discharge apparatus. Portions of this disclosure will refer to an embodiment in which a user 12 discharges (i.e., "fires") projectiles 22 from an apparatus (which may be referred to as a "projectile gun"), but it should be understood that such description is exemplary only and not limiting except as explicitly set forth in the claims.

Figure 3:
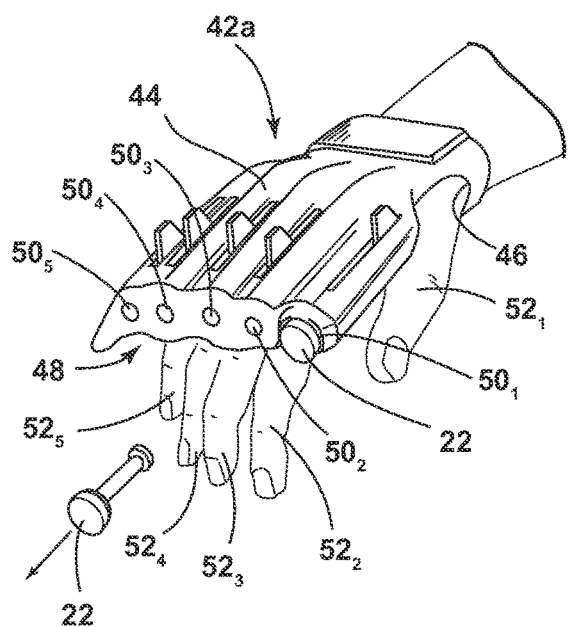
FIG. 3 is an isometric view of an exemplary embodiment of a first hand-worn projectile discharge apparatus that may be used in a video game incorporating live-action combat.

FIG. 3 is an isometric view of an exemplary embodiment of a first hand-worn projectile discharge apparatus 42a for dart-style projectiles 22a. The first hand-worn projectile discharge apparatus 42a may be similar to that described in U.S. Pat. No. 5,359,985 ("the '985 patent"), which is hereby incorporated by reference in its entirety. Though a more thorough description of an embodiment of the projectile discharge apparatus 42a is given in the '985 patent, a brief description is given below.

The hand-worn projectile discharge apparatus 42a may have a generally ribbed and substantially planar first portion 44 and opposed and downwardly extending side portions 46 which cooperate with the planar portion 44 to form a generally cup-shaped recess 48 which is adapted to overlay the back side of a user's hand, opposite the user's palm. The apparatus 42a may include one or more projectile reception chambers 50; the embodiment illustrated in FIG. 3 includes five projectile reception chambers $50_1$, $50_2$, $50_3$, $50_4$, $50_5$ which may be configured to dischargedly receive projectiles 22a. The projectile discharge apparatus 42 may enable the user to discharge a projectile 22a from one of the chambers $50_1$, $50_2$, $50_3$, $50_4$, $50_5$ by pulling a trigger with a finger $52_1$, $52_2$, $52_3$, $52_4$, $52_5$ that is associated with that chamber 50. That is, the projectile discharge apparatus 42a may include a first trigger for the user's thumb $52_1$ that, when pulled, causes a projectile to be discharged from a first projectile reception chamber $50_1$, a second trigger for the user's index finger $52_2$ that, when pulled, causes a projectile to be discharged from a second projectile reception chamber $50_2$, and so on.

The hand-worn projectile discharge apparatus 42a may advantageously enable a user to wear the projectile discharge apparatus 42a while also holding and manipulating a handheld controller for a video game, in an embodiment. Such flexibility may aid in a video game incorporating a segment in which a user directs action on a display with the handheld controller and a segment in which the user propels projectiles at one or more targets, as described herein. Alternatively, in an embodiment, the projectile discharge apparatus 42a may be configured to be held, rather than worn, by the user.

Referring to FIGS. 1-3, the projectile discharge apparatus 42a may be used by the user 12 to fire one or more projectiles 22 (e.g., such as one or more of the projectiles 22a of FIGS. 2 and 3) at, for example, the projectile targets 20. Of course, additional or alternative projectile discharge apparatuses 42a may be used, and additional or alternative projectiles 22 may be used. That is, the projectile 22a of FIG. 2 (and the features thereof) and the projectile discharge apparatus 42a of FIG. 3 (and the features thereof) are exemplary only, and are not limiting except as explicitly set forth in the claims.

Referring again to FIG. 1, the automated projectile apparatus 26 may be provided in the system 10 to fire projectiles 22 at the user 12, in an embodiment. The automated projectile apparatus 26 may include a housing 54 having a plurality of projectile reception chambers 56 that are each configured to fire one or more projectiles 22. The projectile(s) 22 discharged by the automatic projectile apparatus 26 may be the same type of projectiles 22 fired by the user 12 at the projectile targets 20, in an embodiment, so that a user 12 may interchangeably use the same projectiles 22 in a projectile discharge apparatus 42a (see FIG. 3) operated by the user 12 as are fired by the automatic projectile apparatus 26.

The automated projectile apparatus 26 may be configured to hang on a wall, in an embodiment. That is, the housing 54 may include one or more support structures, such as brackets, for coupling with the wall through one or more screws, nails, picture wires, etc. Additionally or alternatively, the automated projectile apparatus 26 may be configured to rest on the floor and/or another surface, and/or be supported by a stand.

The automated projectile apparatus 26 may be in electronic communication with one or more of the video game system 14, the camera 18, the projectile targets 20, one or more devices intended to held by, worn by, or coupled to a user (e.g., a controller, helmet, etc.) and other devices in the system, in an embodiment. The automatic projectile apparatus 26 may operate under the control of the video game system 14, in an embodiment. For example, the video game system 14 may analyze the output of the camera 18 to aim the automated projectile apparatus 26 at the user and may command the automated projectile apparatus 26 to discharge one or more projectiles 22 at a user 12.

The automated projectile apparatus 26 may additionally include one or more components to assist in aiming the automated projectile apparatus 26, in an embodiment. For example, the housing 54 of the automated projectile apparatus may be mechanically coupled with one or more hydraulic actuators, linear encoder motors, rotary encoder motors, and the like to aim the entire housing 54 (and correspondingly aim the projectile reception chambers 56) in the X-direction and the Z-direction (see FIG. 1), where the X-direction is lateral, generally parallel to the floor, and the Z-direction is vertical, generally parallel to the wall. The automated projectile apparatus 26 may additionally or alternatively be configured for aiming in the Y-direction, in an embodiment. Additionally or alternatively, one or more of the projectile reception chambers 56 may be configured for aiming independent of one or more of the other projectile reception chambers 56. For example, the housing 54 may comprise two, three, four, five, or more rows or columns, in which each row or column is configured to be aimed independent of the other rows or columns in at least one spatial dimension. For example, in an embodiment, the automated projectile apparatus 26 may include five rows of projectile reception chambers 56. The rows may be configured for independent aiming in the X-direction (e.g., through separate hydraulic actuators, linear encoders, rotary encoders, and the like), but for common aiming in the Z-direction.

The automated projectile apparatus 26, and gameplay associated with the automated projectile apparatus 26, may include various features for varying gameplay, in embodiments. For example, the automated projectile apparatus may include a plurality of projectile propulsion speeds. In a further example, a user may be given a warning in advance of a projectile being fired from the automated projectile apparatus (e.g., on the display 16), and the amount of time between the warning and the projectile being fired may vary.

With continued reference to FIG. 1, one or more movement targets 24 (with two such movement targets $24_1$, $24_2$ shown) may be provided as objects to which a user must move, for example, when prompted by a video game. A movement target 24 may be or may include any appropriate shape, size, and physical configuration. In an embodiment, a movement target 24 may simply be an object that is proximate a user playing a video game according to the present disclosure.

The movement target 24 may include one or more buttons, switches, surfaces, etc. that a user may contact. Such buttons, switches, surfaces, etc. may be coupled to or may include pressure sensors, touch sensors, and/or other types of sensors for detecting a touch or impact from a user. For example, a button may be provided on the top 58 of a movement target 24.

A movement target 24 may be in electronic communication with one or more of the video game system 14, the camera 18, the automated projectile apparatus 26, and other devices in the system 10. The movement target 24 may transmit a signal to indicate that a user 12 has made contact with the movement target 24. For example, the movement target 24 may transmit a signal to the video game system 14 to indicate that a user 12 has touched the movement target 24, responsive to which the video game system 14 may provide the user feedback regarding the contact (e.g., the speed with which the user 12 made contact, measured as the time from when a prompt was given to when the user contacts the movement target 24, for example) and/or advance to another segment of the game.

In addition to the devices and systems illustrated in FIG. 1, the system 10 may include additional and/or alternative devices and systems for use in gameplay. For example, the system 10 may include one or more of a user-manipulated controller, a user-manipulated projectile propelling apparatus, a helmet, a push-up counter, a jump-rope counter, and/or other devices and components.

Figure 4:
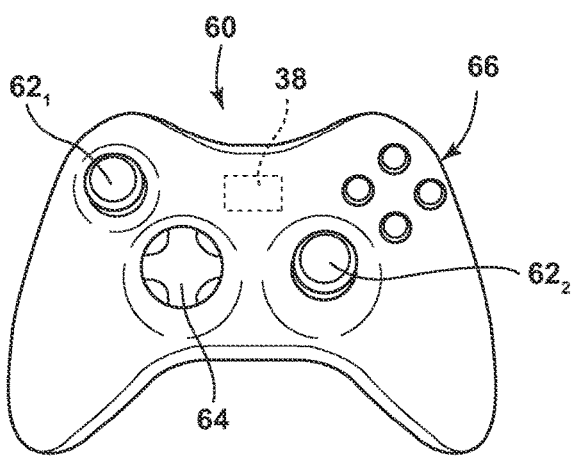
FIG. 4 is a front view of an exemplary embodiment of a handheld controller that may be used in a video game incorporating live-action combat.

In an embodiment, the system 10 may include a handheld controller for use by the user. FIG. 4 is a front view of an exemplary embodiment of a handheld controller 60 that may be used in the system. The handheld controller 60 may be used by a user, for example, to direct action of a game on the display. The controller 60 may function substantially similarly to known handheld controllers, in an embodiment, in terms of its capabilities for commanding action on a display.

The controller 60 may include one or more elements for directional control, in an embodiment. For example, as illustrated in FIG. 4, the controller may include one or more joysticks 62 (two such joysticks $62_1$, $62_2$ are illustrated) and one or more directional pads 64. The controller may further include one or more buttons 66, switches, levers, and other elements allowing the user to provide input for a game. The controller 60 may be configured for handheld operation by a user, in an embodiment. Additionally or alternatively, the controller 60 may be configured to be supported by the floor, a table, a wall, a supporting structure, etc.

The controller 60 may include one or more tags/sensors/antennas (e.g., similar to or the same as the one or more tags/sensors/antennas that may be included on the projectile 22*a* illustrated in FIG. 2). The one or more tags may be provided for the controller 60 to be more effectively tracked by the system 10 (e.g., imaged by the camera 18) (see FIG. 1). For example, referring to FIGS. 1 and 4, the camera 18 may be configured to capture images in the infrared spectrum (e.g., among other things and spectra), and the controller 60 may include one or more infrared reflectors. The video game system 14 may thus use the infrared images captured by the camera 18 to determine the location of the controller 60 and command the automated projectile apparatus 26 to discharge a projectile 22 towards the controller 60 (i.e., under the assumption that a user 12 is holding or otherwise manipulating or near the controller 60).

The controller 60 may be in electronic communication with one or more of the video game system 14, the camera 18, the automated projectile apparatus 26, and/or another device or component in the system 10. The controller 60 may transmit, for example and without limitation, commands for, e.g., controlling display-centric gameplay and/or data for tracking the controller 60.

Figure 5:
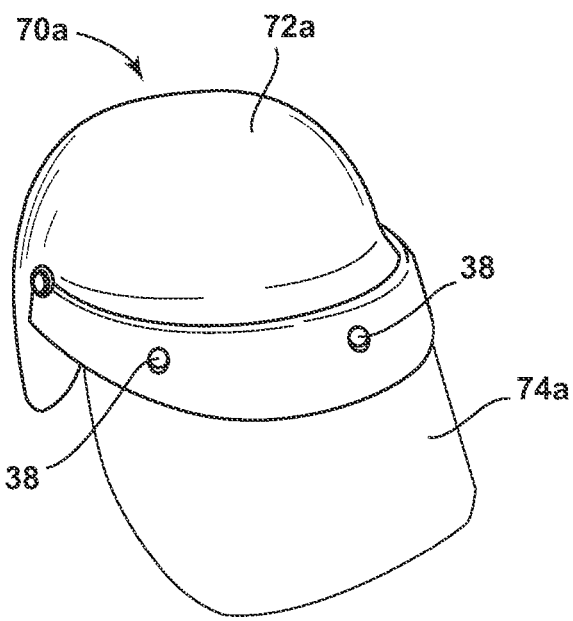
FIG. 5 is an isometric view of a first exemplary embodiment of a helmet that may be worn by a user for a video game incorporating live-action combat.

The system 10 may further include a helmet configured to be worn by the user. FIG. 5 is an isometric view of an exemplary first embodiment of such a helmet 70*a*. In an embodiment, the helmet 70*a* may include a crown portion 72*a* configured to fit on or over the top of the user's head, a facial protection portion 74*a* configured to partially or completely shield the user's face, and one or more tags/sensors/antennas 38.

The crown portion 72*a* of the helmet 70*a* may comprise any size, shape, and materials appropriate for comfortably being worn on the user's head. The crown portion 72*a* may be relatively solid, as illustrated in FIG. 5, or may have one or more vents, holes, or other discontinuities. In an embodiment, the crown portion 72*a* of the helmet 70*a* may comprise a simple wire frame or other relatively light structure suitable for supporting one or more tags/sensors/antennas 38 and/or the facial protection portion 74*a*. In an embodiment, the crown portion 72*a* may comprise a strap for supporting one or more tags/sensors/antennas 38 and/or the facial protection portion (i.e., the helmet 70*a* may be or may resemble goggles or other eyewear).

The facial protection portion 74*a* of the helmet 70*a* may be provided to shield the user from projectiles discharged toward the user. Accordingly, the facial protection portion 74*a* may comprise a visor, a cage, and/or any other appropriate structure. The facial protection portion 74*a* may be entirely or mostly translucent or transparent, in an embodiment, so as to minimize the degree to which the facial protection portion 74*a* impedes user's vision.

Like the controller 60 of FIG. 4 and the projectile 22*a* of FIG. 2, one or more tags/sensors/antennas 38 may be provided on the helmet 70*a* for the helmet 70*a* to be more effectively tracked by the system 10 (e.g., imaged by the camera 18) (see FIG. 1). For example, referring to FIGS. 1 and 5, the camera 18 may be configured to capture images in the infrared spectrum (e.g., among other things and spectra), and the helmet 70*a* may include one or more infrared reflectors. The video game system 14 may thus use the infrared images captured by the camera 18 to determine the location of the helmet 70*a* and command the automated projectile apparatus 26 to discharge a projectile 22 towards the helmet 70*a* (i.e., under the assumption that a user 12 is wearing the helmet 70*a*).

The helmet 70*a* may be in electronic communication with one or more of the video game system 14, the camera 18, the automated projectile apparatus 26, and/or another device or component in the system 10. The helmet 70*a* may transmit, for example and without limitation, data for tracking the helmet 70*a*.

Figure 6:
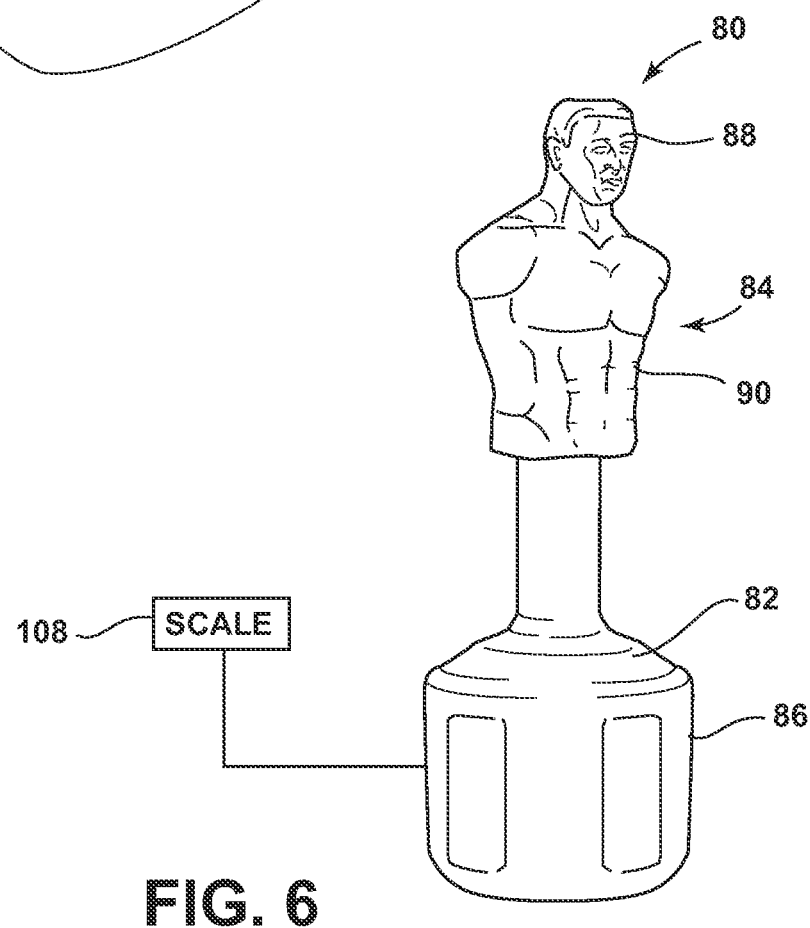
FIG. 6 is an isometric view of an exemplary embodiment of a dummy that may be used in a video game incorporating live-action combat.

The system 10 may also include a dummy for punching, tackling, grappling, or other manual striking FIG. 6 is an isometric view of an exemplary embodiment of a dummy 80. The dummy 80 may include a support portion 82 and a striking portion 84. The striking portion 84 may include one or more surfaces configured in size, shape, and materials to be manually struck by, e.g., a user's body or a portion of a user's body, such as a fist, foot, elbow, etc., and/or by a projectile. The support portion 82 may be configured to support the striking portion 84 in a position to be struck by the user, and/or by a projectile. For example, the support portion 82 may include a base 86 configured to rest on the floor and to stand the striking portion upright. Additionally or alternatively, the support portion may include a rack or other structure configured to couple the striking portion to a wall or ceiling.

The dummy 80 (or a portion thereof) may resemble a human or other lifelike opponent, in an embodiment, as illustrated in FIG. 6. Accordingly, the striking portion of the dummy 80 may include a head 88 and a torso 90, in an embodiment. Additionally or alternatively, a portion of the dummy 80 may simply be configured in a shape convenient for striking generally (e.g., cylindrical structure, such as a boxing heavy bag or a rectangular structure, such as a punching board) or for a particular type of strike (e.g., for punching, such as a boxing speed bag).

The striking portion 84 of the dummy 80 may include and/or may be coupled with one or more sensors for detecting a strike by a user. For example, the dummy may include one or more pressure sensors, one or more optical sensors, one or more lasers, and/or one or more other sensors for detecting an impact of a strike by a user's body or other object, in an embodiment.

In an embodiment, the dummy 80 may include and/or may be coupled with one or more sensors for detecting a strike by a projectile. Accordingly, the dummy 80 may include features for tracking a projectile fired at the dummy. For example, the dummy 80 may include one or more pressure sensors, one or more optical sensors, one or more lasers, and/or one or more other sensors for detecting an impact or presence of a projectile or other object, in an embodiment. Additionally or alternatively, the dummy 80 may include a sensor configured to detect a feature of a projectile. For example, the dummy 80 may include an RFID reader, a capacitive touch surface, and/or one or more readers, sensors, or other devices configured to operate in conjunction with a tracking feature of a projectile.

One or more portions of the dummy may be configured for movement, in an embodiment. For example, the dummy may be configured (e.g., disposed on a track) for movement in the X-direction and/or Y-direction, in an embodiment. Additionally or alternatively, one or more portions of the dummy may be configured for movement in the Z-direction. The dummy may include one or more hydraulic or other actuators, linear encoders, etc. to enable such movement. Furthermore, in an embodiment, dummy movement may be configured to strike at a user. Movement of the dummy may be under the control of the video game system 14 (see FIG. 1), in an embodiment.

The dummy may include, may be associated with, and/or may be in electronic communication with a weight scale 108. The scale may be used to measure a user's weight, in an embodiment, which weight may be used to assess the user's manual strikes of the dummy.

Numerous devices and systems in this disclosure are stated to be in electronic communication with one or more other devices or systems. Such description should be understood to assert that such devices and systems include or are electrically coupled with appropriate hardware, software, and components to achieve such communication. Electronic communication between devices and systems in this disclosure may be through either wired or wireless communications (or a combination of wired and wireless communications) according to any communications protocol or combination of communications protocols. For example, devices and systems according to the present disclosure according to, for example only and without limitation, Bluetooth, Bluetooth Low Energy, IPv4, IPv6, and/or any other appropriate communications protocol.

Referring to FIGS. 1 and 6, one or more of the devices and apparatus that are configured to be struck or otherwise contacted by the user and/or a projectile 22 (e.g., the projectile targets 20, the dummy 80, the movement targets 24, and/or other devices and apparatus that may be provided) may include one or more indicators to draw a user's attention and/or to provide feedback to the user. For example, a visual, audible, or other indication may be provided to indicate that a projectile target 20 is to be fired upon, to indicate that the dummy 80 is to be struck, or to indicate that a movement target 24 is to be touched. Additionally or alternatively, the same or separate visual, audible, or other indicators may be provided to indicate a degree of success (e.g., successful, unsuccessful, or a score or other feedback) of an attempted strike or contact of a projectile target 20, dummy 80, movement target 24, or other object. Accordingly, one or more of the projectile targets 20, the dummy 80, the movement targets 24, and/or other device or component of the system may include one or more lights, speakers, or other devices appropriate for notifications and/or other purposes.

In an embodiment, a user may be provided with numerous wearable apparatus that may act as protection against projectiles, may be used to fire projectiles, and/or may act as targets for projectiles. For example, FIGS. 3 and 5 illustrate embodiments of user-wearable apparatus. FIGS. 7A-12 illustrate additional or alternative embodiments of user-wearable apparatus.

Figure 7A:
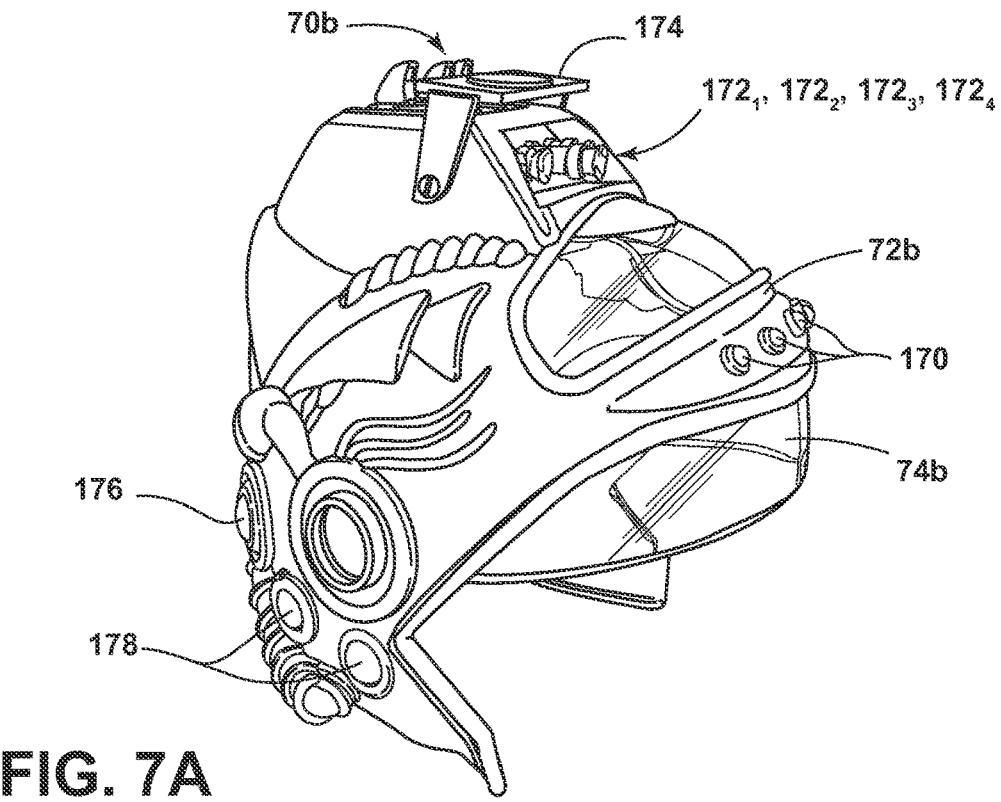
FIGS. 7A and 7B are isometric views of a second exemplary embodiment of a helmet that may be worn by a user for a video game incorporating live-action combat.
Figure 7B:
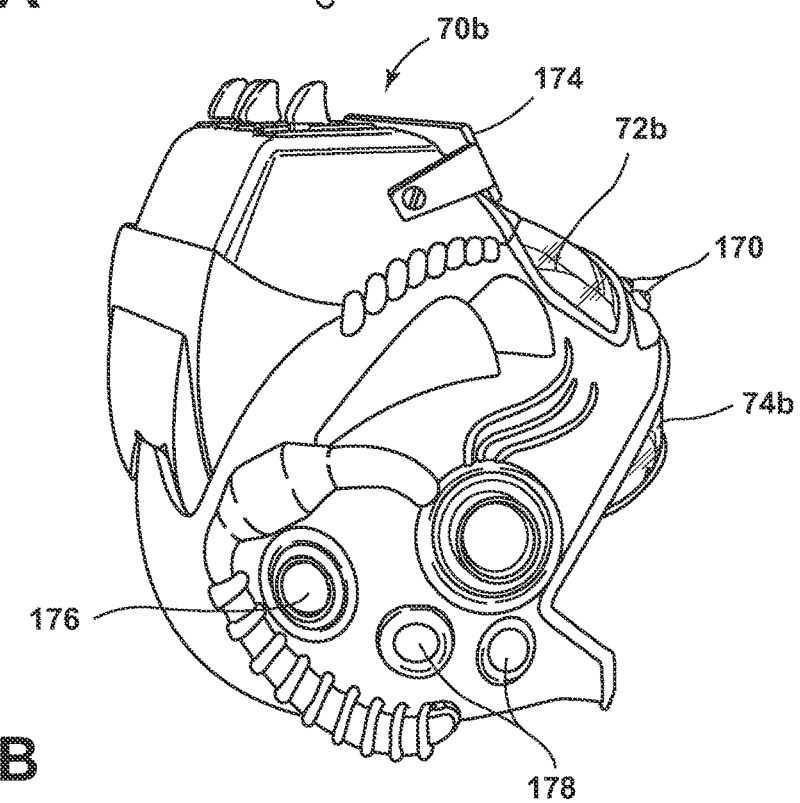

FIGS. 7A and 7B are isometric views of a second embodiment of a helmet 70b. In an embodiment, the helmet 70b may include a crown portion 72b configured to fit on or over the top of the user's head, a facial protection portion 74b configured to partially or completely shield the user's face, and one or more lights 170.

The crown portion 72b of the helmet 70b may comprise any size, shape, and materials appropriate for comfortably being worn on the user's head. The crown portion 72b may be relatively solid, as illustrated in FIGS. 7A and 7B, or may have one or more vents, holes, or other discontinuities. In an embodiment, the crown portion 72b of the helmet 70b may comprise a simple wire frame or other relatively light structure suitable for supporting one or more tags/sensors/antennas and/or the facial protection portion. In an embodiment, the crown portion may consist only of a strap (e.g., the helmet 70b may resemble a pair of goggles).

The facial protection portion 74b of the helmet 70b may be provided to shield the user from projectiles discharged toward the user. Accordingly, the facial protection portion 74b may comprise a visor, a cage, and/or any other appropriate structure. The facial protection portion 74b may be entirely or mostly translucent or transparent, in an embodiment, so as to minimize the degree to which the facial protection portion 74b impedes user's vision.

The lights 170 provided on the helmet 70b may act as targets, for example, for one or more projectiles fired from an automated projectile apparatus, or may be used to track the position and movement of the user. In an embodiment, instead of or in addition to lights 170, the helmet 70b may be provided with one or more other types of tags/sensors/antennas. Such tags/sensors/antennas may be used for the same or similar purposes as other tags/sensors/antennas described herein such as, for example and without limitation, tracking the position and movement of the user, as targets for projectiles automatically fired by the system, for data transmission, etc.

The helmet 70b may also include, in an embodiment, a plurality of projectile reception chambers 172 that are each configured to fire one or more projectiles. The projectile reception chambers 172 may be configured to receive and fire the same projectiles as are fired by other components illustrated and/or described herein including, but not limited to, the automated projectile apparatus 26 (see FIG. 1) and the first hand-worn projectile discharge apparatus 42a (see FIG. 3). For example, as shown in FIG. 7B, the helmet 70b may include four (4) projectile reception chambers $172_1$, $172_2$, $172_3$, $172_4$, in an embodiment. The projectile reception chambers may be associated with one or more covers 174, in an embodiment. Each cover 174 may be operable to selectively cover or expose one or more projectile reception chambers 172. FIG. 7A illustrates a cover 174 in a closed position, and FIG. 7B illustrates the cover 174 in an open position. With the cover 174 in the open position, projectiles may be fired from the projectile reception chambers 172. In an embodiment, the cover 174 may be mechanically coupled with a release button 176, switch, or other device that may be actuated by the user to switch (i.e., open and/or close) the position of the cover 174.

The helmet 70b may also include, in an embodiment, one or more triggers 178 for firing projectiles from the projectile reception chambers 172. For example, the helmet 70b may include one trigger 178 for each projectile reception chamber 172, each trigger 178 associated with a particular projectile reception chamber 172. In the exemplary embodiment of FIGS. 7A and 7B, the helmet 70b includes four (4) triggers 178, two disposed on each lateral side of the helmet crown portion 72b. Additionally or alternatively, the projectile reception chambers 172 may be configured to fire projectiles responsive to one or more triggers or other input from a device or system other than the helmet itself. For example, in an embodiment, the projectile reception chambers 172 may be responsive to one or more triggers on a projectile discharge apparatus worn on or configured for manipulation by the user's hand, responsive to a handheld controller, etc.

Figure 8B:
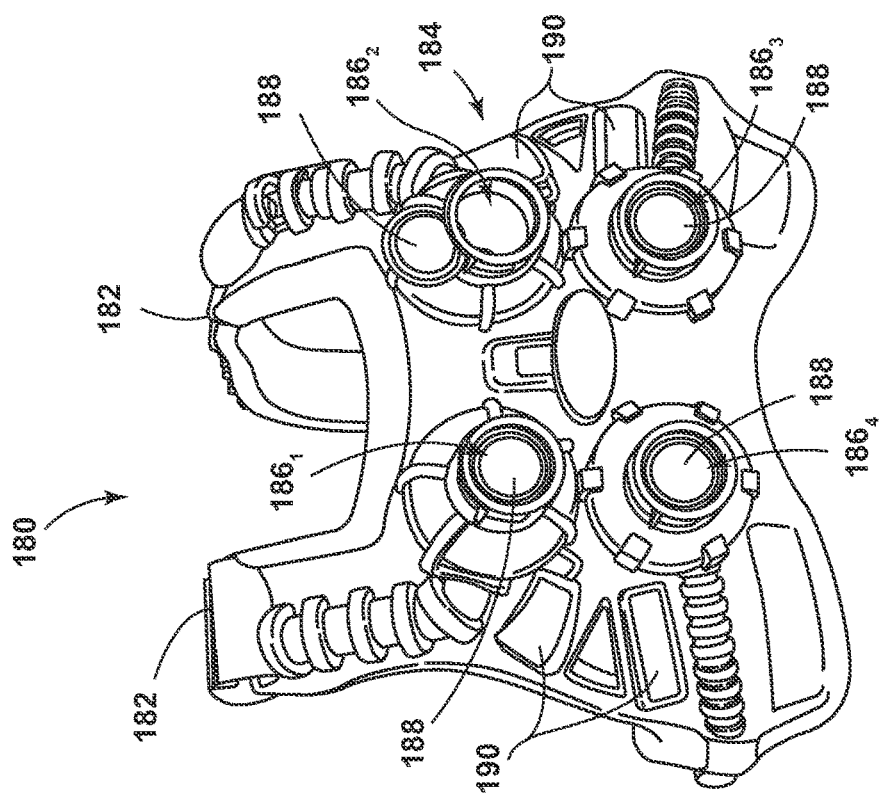
FIGS. 8A and 8B are isometric views of an exemplary embodiment of a vest that may be worn by a user for a video game incorporating live-action combat.
Figure 8A:
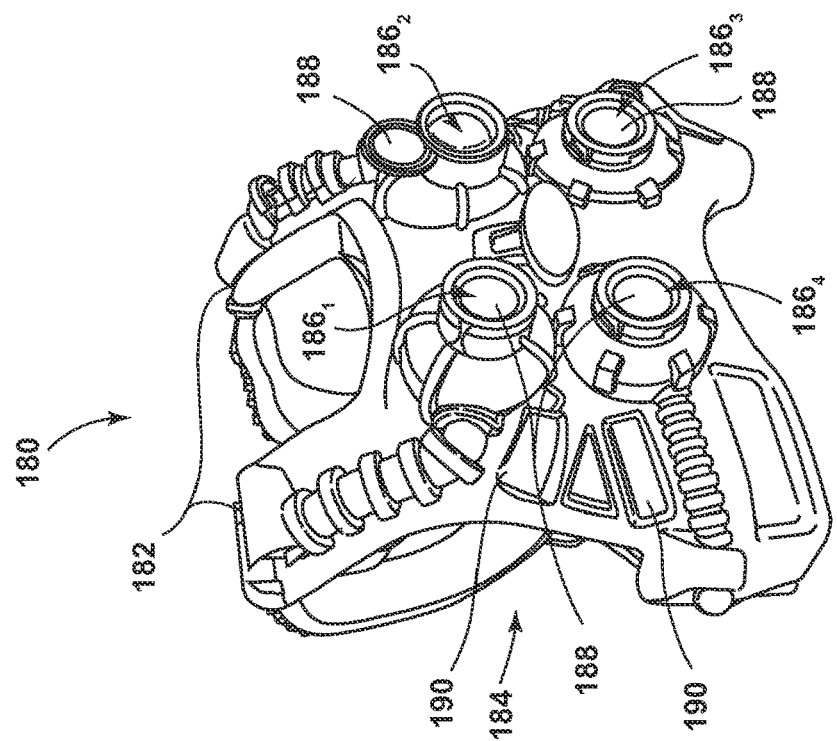

FIGS. 8A and 8B are isometric views of an exemplary embodiment of a vest 180 that may be worn by a user during a game according to the present disclosure. The vest 180 may include, in an embodiment, one or more shoulder straps 182 and a chest portion 184.

The vest 180 may also include, in an embodiment, a plurality of projectile reception chambers 186 that are each configured to fire one or more projectiles. The projectile reception chambers 186 may be configured to receive and fire the same projectiles as are fired by other components illustrated and/or described herein including, but not limited to, the automated projectile apparatus 26 (see FIG. 1), the hand-worn projectile discharge apparatus 42a (see FIG. 3), or the helmet 70b (see FIGS. 7A, 7B). Alternatively, as shown in FIG. 8A, the projectile reception chambers 186 of the vest 180 may be configured to fire different projectiles than at least one other components illustrated and/or described herein. For example, the vest may include four (4) projectile reception chambers $186_1$, $186_2$, $186_3$, $186_4$, each configured to receive and fire a ball-style projectile. The projectile reception chambers 186 may be associated with one or more covers 188, in an embodiment. Each cover 188 may be operable to selectively cover or expose one or more projectile reception chambers 186. FIGS. 8A and 8B illustrate three covers 188 in a closed position, and one cover 188 in an open position. With a cover 188 in the open position, a projectile may be fired from the exposed projectile reception chamber 186 (the projectile reception chamber $186_2$ is exposed in FIGS. 8A and 8B). In an embodiment, each cover 188 may be mechanically coupled with a release button, switch, or other device that may be actuated by the user to switch (i.e., open and/or close) the position of the cover.

The vest 180 may be provided with one or more tags/sensors/antennas. Such tags/sensors/antennas may be used for the same or similar purposes as other tags/sensors/antennas described herein such as, for example and without limitation, tracking the position and movement of the user, as targets for projectiles automatically fired by the system, for data transmission, etc.

The vest 180 may also include, in an embodiment, one or more triggers 190 for firing projectiles from the projectile reception chambers 186. For example, the vest may include one trigger 190 for each projectile reception chamber 186, each trigger 190 associated with a particular projectile reception chamber 186. In the exemplary embodiment of FIGS. 8A and 8B, the vest includes four (4) triggers 190, two disposed on each lateral side of the chest portion 184. Additionally or alternatively, the projectile reception chambers 186 may be configured to fire projectiles responsive to one or more triggers or other input from a device or system other than the vest itself. For example, in an embodiment, the projectile reception chambers 186 may be responsive to one or more triggers on a projectile discharge apparatus worn on or configured for manipulation by the user's hand, responsive to a handheld controller, etc.

FIG. 9A is an isometric view of an embodiment of a first (e.g., lower) right shoulder apparatus $200_R$, and FIG. 9B is an isometric view of an embodiment of a first (e.g., lower) left shoulder apparatus $200_L$, that may be worn by a user for a game according to the present disclosure. The right and left first shoulder apparatus $200_R$, $200_L$ may be mirror structures, in an embodiment. Accordingly, the right and left first shoulder apparatus $200_R$, $200_L$ may be referred to generically herein as a first shoulder apparatus 200 or as the first shoulder apparatus 200. Features described herein for one first shoulder apparatus 200 should be understood to apply to both first shoulder apparatus 200. It should also be understood, however, that the right and left shoulder apparatus $200_R$, $200_L$ may differ from each other, in embodiments.

Each first shoulder apparatus 200 may include a shoulder mounting portion 202 and one or more arm attachment portions 204, in an embodiment. The shoulder mounting portion 202 may comprise a supporting structure for a plurality of projectile reception chambers 206 that are each configured to fire one or more projectiles, in an embodiment. The projectile reception chambers 206 may be configured to receive and fire the same projectiles as are fired by other components illustrated and/or described herein including, but not limited to, the automated projectile apparatus 26 (see FIG. 1), the hand-worn projectile discharge apparatus 42a (see FIG. 3), the helmet 70b (see FIGS. 7A and 7B), or the vest 180 (see FIGS. 8A and 8B). For example, as shown in FIG. 9B, the first shoulder apparatus may include three (3) projectile reception chambers 206, each configured to receive and fire a dart-style projectile. The projectile reception chambers 206 may be associated with one or more covers 208, in an embodiment. Each cover 208 may be operable to selectively cover or expose one or more projectile reception chambers 206. FIG. 9A illustrates a cover 208 in a closed position, and FIG. 9B illustrates the cover 208 in an open position. With the cover 208 in the open position, a projectile may be fired from one or more exposed projectile reception chambers 206. In an embodiment, the cover 208 may be mechanically coupled with a release button, switch, or other device that may be actuated by the user to switch (i.e., open and/or close) the position of the cover.

The first shoulder apparatus 200 may also include, in an embodiment, one or more triggers for firing projectiles from the projectile reception chambers 206. For example, the first shoulder apparatus may include a trigger for each projectile reception chamber 206, each trigger associated with a particular projectile reception chamber 206. Additionally or alternatively, the projectile reception chambers 206 may be configured to fire projectiles responsive to one or more triggers or other input from a device or system other than the first shoulder apparatus 200 itself. For example, in an embodiment, the projectile reception chambers 206 may be responsive to one or more triggers on a projectile discharge apparatus worn on or configured for manipulation by the user's hand, responsive to a handheld controller, etc.

The arm attachment portion 204 of the first shoulder apparatus 200 may include one or more fasteners 212 (two such fasteners 212 are included on the embodiments of the first shoulder apparatus 200 illustrated in FIGS. 9A and 9B). A fastener 212 may be or may include, for example and without limitation, a strap, a hook-and-loop fastener, a clip, a button, and the like. The arm attachment portion 204 may further include a release button 214, switch, etc. configured to release the cover 208, for example.

In an embodiment, the first shoulder apparatus may include one or more lights. Additionally or alternatively, the first shoulder apparatus may include one or more other tags/sensors/antennas, for substantially the same reasons as described with respect to other devices in this disclosure. That is, one or more lights and/or other tags/sensors/antennas may be included in the first shoulder apparatus to aid in tracking the position and movement of the user, to act as a target for projectiles automatically fired by the system, to transmit and/or receive data, etc.

Figure 10A:
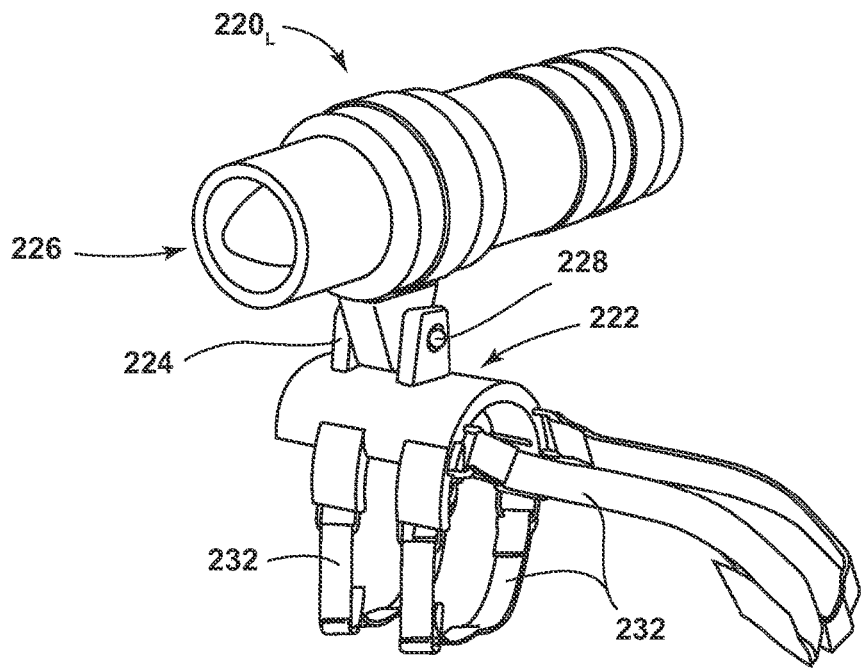
FIGS. 10A and 10B are isometric views of an embodiment of a second left shoulder apparatus that may be worn by a user for a video game incorporating live-action combat.
Figure 10B:
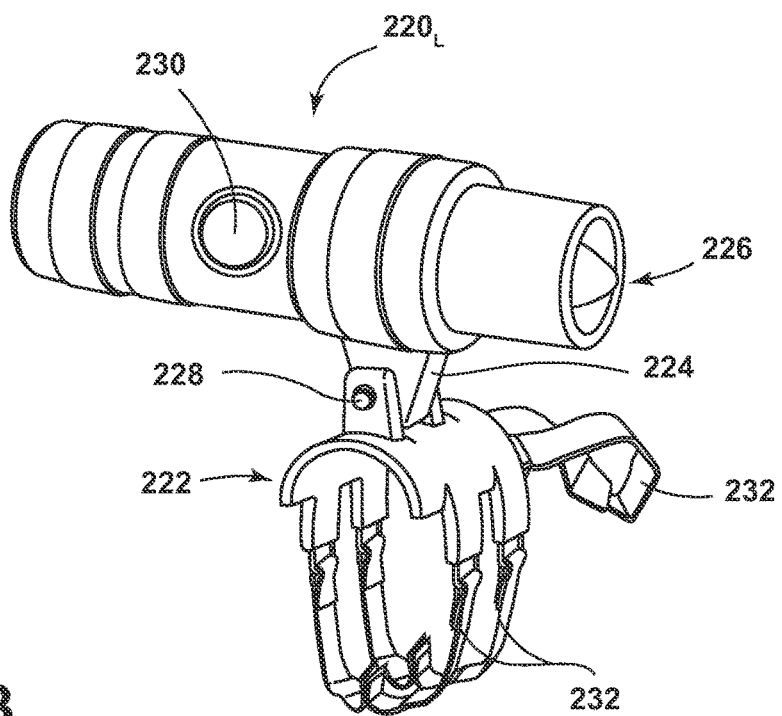

FIGS. 10A and 10B are isometric views of an embodiment of a second (e.g., upper) left shoulder apparatus $220_L$ that may be worn by a user for a game according to the present disclosure. The second left shoulder apparatus $220_L$ may be accompanied by a mirrored second right shoulder apparatus $220_R$, in an embodiment (see FIG. 11). The second right and left shoulder apparatus $220_R$, $220_L$ may be referred to generically herein as a second shoulder apparatus 220 or as the second shoulder apparatus 220. Features described herein for one of the second shoulder apparatus 220 should be understood to apply to both second shoulder apparatus 220. It should also be understood, however, that the right and left second shoulder apparatus $220_R$, $220_L$ may differ from each other, in embodiments.

Each second shoulder apparatus 220 may include a shoulder mounting portion 222. The shoulder mounting portion 222 may comprise a supporting structure 224 for one or more projectile reception chambers 226 that are each configured to fire one or more projectiles, in an embodiment. The projectile reception chambers 226 may be configured to receive and fire the same projectiles as are fired by other components illustrated and/or described herein including, but not limited to, the automated projectile apparatus 26 (see FIG. 1), the hand-worn projectile discharge apparatus 42a (see FIG. 3), the helmet 70b (see FIGS. 7A and 7B), the vest 180 (see FIGS. 8A and 8B), or the first shoulder apparatus 200 (see FIGS. 9A and 9B). Alternatively, the second shoulder apparatus 220 may be configured to receive and fire one or more projectiles that are different from those used by other apparatus and devices illustrated and/or described herein. For example, as shown in FIGS. 10A and 10B, the second shoulder apparatus 220 may include one (1) projectile reception chamber 226, each configured to receive and fire a missile-style projectile. The projectile reception chamber 226 may be associated with one or more covers, in an embodiment. Each cover may be operable to selectively cover or expose a projectile reception chamber.

The projectile reception chamber 226 may be movably coupled with the shoulder mounting portion 222 of the second shoulder apparatus 220, in an embodiment. For example, as illustrated in FIGS. 10A and 10B, the projectile reception chamber 226 may be coupled to the shoulder mounting portion 222 via a hinge 228, enabling the projectile reception chamber 226 to pivot. Additionally or alternatively, in an embodiment, the projectile reception chamber 226 may be coupled to the shoulder mounting portion 222 so as to slide, rotate, and/or otherwise move relative to the shoulder mounting portion 222.

The second shoulder apparatus 220 may also include, in an embodiment, one or more triggers 230 for firing projectiles from the projectile reception chambers 226. For example, the first shoulder apparatus 220 may include one trigger 230 for each projectile reception chamber 226, each trigger 230 associated with a particular projectile reception chamber 226. Additionally or alternatively, the projectile reception chambers 226 may be configured to fire projectiles responsive to one or more triggers or other input from a device or system other than the second shoulder apparatus 220 itself. For example, in an embodiment, the projectile reception chambers 226 may be responsive to one or more triggers on a projectile discharge apparatus worn on or configured for manipulation by the user's hand, responsive to a handheld controller, etc.

The shoulder mounting portion 222 of the second shoulder apparatus may include one or more fasteners 232 (three such fasteners 232 are included on each of the second shoulder apparatus 220 of FIGS. 10A and 10B), in an embodiment. A fastener 232 may be or may include, for example and without limitation, a strap, a hook-and-loop fastener, a clip, a button, and the like.

In an embodiment, the second shoulder apparatus 220 may include one or more lights. Additionally or alternatively, the second shoulder apparatus 220 may include one or more other tags/sensors/antennas, for substantially the same reasons as described with respect to other devices in this disclosure. That is, one or more lights and/or other tags/sensors/antennas may be included in the second shoulder apparatus 220 to aid in tracking the position and movement of the user, to act as a target for projectiles automatically fired by the system, to transmit and/or receive data, etc.

Figure 11:
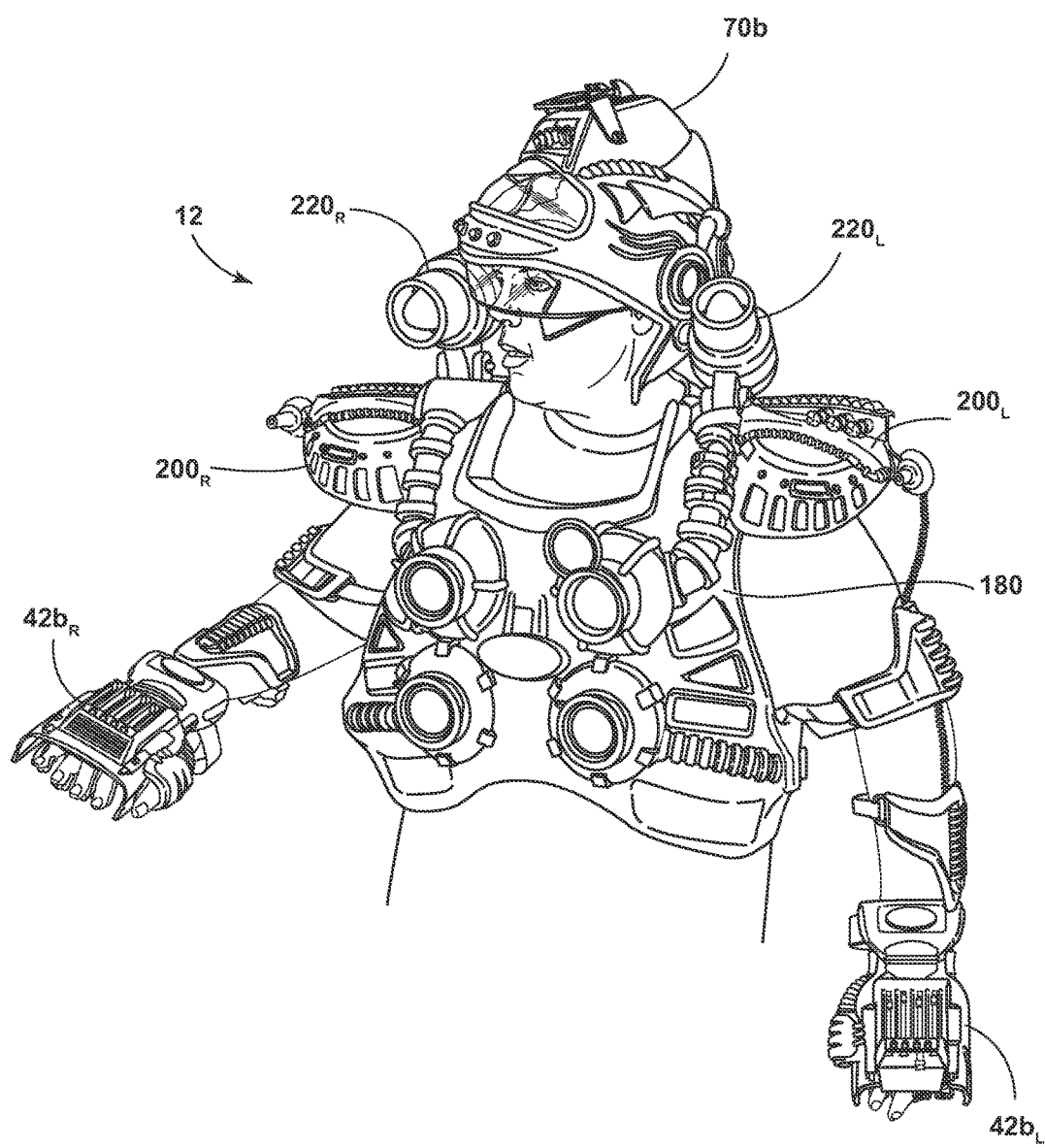
FIG. 11 illustrates various apparatus, worn by a user, that may be used in a video game incorporating live-action combat.

FIG. 11 is an isometric view of the user 12 equipped with numerous user-wearable apparatus, including the second helmet 70b (see also FIGS. 7A and 7B), the vest 180 (see also FIGS. 8A and 8B), the first right and left shoulder apparatus $200_L$, $200_R$ (see also FIGS. 9A and 9B), the second right and left shoulder apparatus $220_R$, $220_L$ (see also FIGS. 10A and 10B), and left-hand and right-hand versions of a second embodiment of a hand-worn projectile discharge apparatus $42b_L$-$42b_R$.

The second hand-worn projectile discharge apparatus 42b may be functionally similar to the first hand-worn projectile apparatus 42a, except the second hand-worn projectile discharge apparatus 42b may include only four projectile reception chambers and four accompanying triggers. The second hand-worn projectile discharge apparatus 42b may further differ from the first hand-worn projectile discharge apparatus 42a, in an embodiment, in that the second hand-worn projectile apparatus 42b may include one or more covers associated with the projectile reception chambers, and one or more lights. The one or more covers and one or more lights of the second hand-worn projectile discharge apparatus 42b may function substantially similarly to other covers and lights on user-wearable apparatus of this disclosure.

Though not shown in FIG. 11, the user 12, while wearing one or more of the user-wearable apparatus shown in FIG. 11 and/or otherwise shown or described in this disclosure, may additionally manipulate and/or interact with additional devices and components such as, without limitation, one or more handheld controllers (see FIG. 4).

Figure 12:
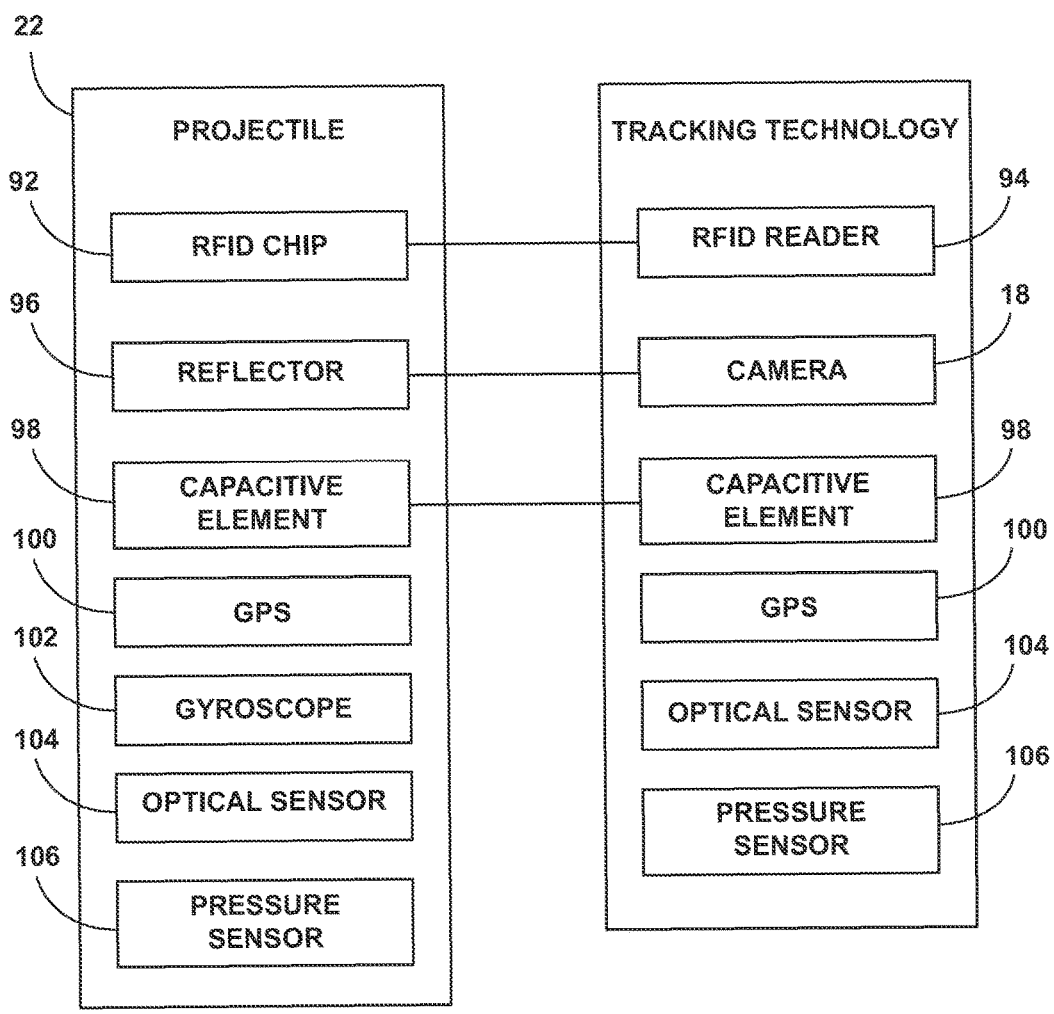
FIG. 12 is a block diagram illustration of various technologies that may be used for tracking a projectile.

As noted above, a projectile 22 and various other components of the system may include features to enable tracking the projectile. FIG. 12 is a block diagram illustrating various types of sensors, tags, and other technologies that may be included in a projectile 22 and various types of sensors and other technologies that may be included in the a system (e.g., the system 10 of FIG. 1) that may be used for such tracking. Referring to FIG. 12, the projectile 22 may include an RFID chip 92, and a RFID reader 94 may be provided for tracking. The projectile 22 may additionally or alternatively include a reflector 96, and a camera 18 may be provided for tracking. Additionally or alternatively, the projectile 22 may include a capacitive element 98, and a complementary capacitive element 98 may be provided for tracking (i.e., where one capacitive element 98 alters a capacitance of the other capacitive element 98, as in capacitive touch-screen technology). Additionally or alternatively, the projectile 22 may include a GPS chip or antenna 100, a gyroscope 102, an optical sensor 104, and/or a pressure sensor 106, data from which may be transmitted for tracking the projectile 22 by, e.g., determining a position of the projectile 22, determining movement of the projectile 22, determining an impact between the projectile 22 and another object, etc. Additionally or alternatively, one or more targets may be provided with a pressure sensor 106, an optical sensor 104, and/or a GPS chip or antenna 100, data from which may be transmitted for, e.g., determining a position of the target, determining an impact between the target and another object, etc.

Referring to FIGS. 1-11, a game according to the present disclosure may include elements of gameplay in which the user 12 directs action on the display 16 with, for example, the handheld controller 60. Such gameplay elements may be referred to herein as "display-centric gameplay." Display-centric gameplay may include a graphical display of one or more objects including, but not limited to, objects other than projectiles 22 and other live-action combat elements. In an embodiment, display-centric gameplay may additionally include a display of a graphical representation of one or more of the projectiles 22 and/or other live-action combat devices. For display-centric gameplay, the video game system 14 may provide the game on the display 16 according to applicable software and may operate the game according to the user's input. A game according to the present disclosure may also include elements of gameplay in which the user attacks, defends, or defends against physical objects in the user's proximity. Such gameplay elements may be referred to herein as "live-action combat."

Live-Action Combat Elements.

As noted above, live-action combat elements may be combined in a game with display-centric gameplay elements. In an embodiment, an event in the display-centric gameplay may cause the user to be prompted to perform or participate in one or more elements of live-action combat. For example, referring to FIGS. 1 and 6, the video game system 14 may provide one or more prompts on the display 16 and/or with one or more of a projectile target 20, a movement target 24, the dummy 80, or another object. The prompt may direct the user 12 to strike a target (e.g., with a projectile 22 and/or with the user's body), to strike a particular portion of a target, to move to a target or a particular portion of a room, to dodge a projectile 22, or to perform some other physical activity. Examples of various live-action combat gameplay elements are described in further detail below.

Live-Action Combat: User-Fired Projectiles.

Referring to FIG. 1, in one example of live-action combat, the user 12 may be prompted to fire a projectile 22 at one or more designated projectile targets 20. The system 10 may track one or more projectiles fired by the user, and may assess one or more of the speed with which the user 12 fired the projectile 22 following the prompt, the accuracy of the projectile 22, and/or some other aspect of the fired projectile 22. The system 10 may provide feedback to the user 12 regarding one or more assessed aspects of the projectile 22.

A user 12 may be prompted to fire numerous projectiles 22, in an embodiment, at one or more projectile targets 20. Each of the projectiles 22 may be tracked by the system 10, and the user 12 may be assessed a score according to the speed with which the user 12 fires the projectiles 22, the accuracy of the fired projectiles, the distance travelled by the fired projectiles, and/or another aspect of the user's performance. In an embodiment, the user's score may affect subsequent display-centric elements of the game. For example, upon the user 12 successfully hitting the designated projectile target(s) 20 with a projectile 22, the user 12 may resume directing action on the display 16. Additionally or alternatively, the user's performance may be given a score, and the score may grant the user 12 an advantage or disadvantage in display-centric gameplay. Additionally or alternatively, the user's performance may be given separate scores for live-action combat and display-centric gameplay, and those scores may both be included in a cumulative score for the game.

In an embodiment, a user may be prompted to fire a specific projectile or projectiles at a target. For example, a user may be prompted to fire a projectile from a specific apparatus (e.g., hand-worn or handheld projectile discharge apparatus, helmet, shoulder apparatus, etc.) at a specific target. Continuing the example, the user may be prompted to fire a first projectile from a first (e.g., left-hand) hand-worn projectile discharge apparatus at a first target, and a second projectile from a second (e.g., right-hand) hand-worn projectile discharge apparatus at a second target. Alternatively, the user may be prompted to fire a projectile from a specific projectile reception chamber at any target or at a specific target.

In a further example, projectiles and targets may be commonly-coded (e.g., color-coded, number-coded, etc.), and a user may be prompted to fire a projectile at a target having a common coding (e.g., a blue projectile at a blue target, a red projectile at a red target, etc.). The coding of the projectile and/or target may be stored in a tag or sensor associated with the projectile or target, or may be otherwise determined by the system.

Live-Action Combat: User Manual Strikes.

In another example of live-action combat, the user 12 may be prompted to manually strike one or more objects, such as the dummy 80 (see FIG. 6), for example only. Referring to FIGS. 1 and 6, the system 10 may prompt the user 12 to strike a specific portion of the dummy 80 such as, for example, the head 88 or a portion of the torso 90 of the striking portion 84 of the dummy 80. In a further example, the system 10 may prompt the user to perform a particular series of strikes on the dummy.

The system 10 may assess the user's performance relative to prompted strikes and may provide feedback regarding the assessment. For example, in an embodiment, the system 10 may provide a score based on the speed with which the user 12 performs a strike or sequence of strikes (which may be measured by, for example, the amount of time between a prompt and one or more strikes, the amount of time between two or more strikes, the velocity of a user's body making one or more strikes, etc.), the accuracy of a strike or series of strikes, the force of a strike or series of strikes, etc. The score may also be affected by the weight, height, or other physical attribute of the user, in an embodiment. The score may affect subsequent on-display elements of the game, in an embodiment. For example, upon the user 12 successfully manually striking a designated target or portion of a target, performing a prompted series of manual strikes, etc., the user may resume directing action on the display 16. Additionally or alternatively, the user's performance may be given a score, and the score may grant the user an advantage or disadvantage in display-centric gameplay. Additionally or alternatively, the user's performance may be given separate scores for live-action combat and display-centric gameplay, and those scores may both be included in a cumulative score for the game.

Live-Action Combat: User Movement.

In another example, the user 12 may be prompted to move to one or more movement targets 24. With continued reference to FIG. 1, the system 10 may assess the user's performance (e.g., the speed with which the user 12 moves to and touches one or more movement targets 24) and may provide feedback to the user 12 regarding the user's performance. Upon successfully arriving at, touching, striking, or returning from the movement target 24, the user may resume directing action on the display 16.

The system 10 may assess the user's performance relative to prompted movement and may provide feedback regarding the assessment. For example, in an embodiment, the system 10 may provide a score based on the speed with which the user 12 performs a movement or sequence of movements. The score may affect subsequent on-display elements of the game, in an embodiment. For example, upon the user successfully completing a prompted series of movements (e.g., touching a designated one or more movement targets 24), the user 12 may resume directing action on the display. Additionally or alternatively, the user's performance may be given a score, and the score may grant the user 12 an advantage or disadvantage in display-centric gameplay. Additionally or alternatively, the user's performance may be given separate scores for live-action combat and display-centric gameplay, and those scores may both be included in a cumulative score for the game.

Live-Action Combat: Projectiles Fired at User.

With continued reference to FIG. 1, in another example of live-action combat, the user 12 may be prompted to perform one or more tasks while dodging one or more projectiles 22 fired by the automated projectile apparatus 26. For example, the user 12 may be prompted to dodge or evade one or more projectiles 22 while continuing to direct action on the display 16, while attempting to fire one or more projectiles 22 at a projectile target 20, while moving to a movement target 24, etc. The video game system 14 may direct the automated projectile apparatus 26 to aim and fire one or more projectiles 22 at the user 12. The video game system 14 may use images and other data captured by the camera 18, for example, to track the user 12 and thereby aim the automated projectile apparatus 26. The video game system 14 may further use data from the camera 18, from fired projectiles 22, and/or from additional sensors to determine if a projectile 22 fired from the automated projectile apparatus 26 makes contact with the user 12. In an embodiment, whether or not a projectile 22 makes contact with the user 12 (and/or the number of projectiles 22 that make contact with the user 12) may be assessed a score and/or may affect subsequent on-display elements of the game. For example, the number of projectiles 22 fired at the user 12 that the user 12 successfully dodges or evades may grant the user an advantage or disadvantage in display-centric gameplay.

In addition to or instead of firing projectiles at the user, the automated projectile apparatus may fire projectiles at one or more targets associated with the user. The user may be scored based on the user's ability to prevent projectiles from hitting targets, on the user's ability to perform tasks before a certain number of projectiles hit targets, etc.

In an embodiment, the automated projectile apparatus may only fire projectiles at the user if it is confirmed (e.g., by the video game system 14) that the user is wearing protective eyewear (e.g., a helmet) and/or other protective gear. Such confirmation may be based on, for example and without limitation, images captured by the camera, data transmitted from the helmet, user input, etc.

Display-centric and live-action combat elements may find use in a single-player game (i.e., with a single human user 12), in embodiment. Thus, the user 12 may interact with pre-programmed logic routines and artificial intelligence elements in display-centric gameplay and may undertake live-action combat elements responsive to pre-programmed logic routines and artificial intelligence elements. Display-centric and live-action combat elements may also find use in multi-player games in which two or more users cooperate with each other and/or compete against each other. An exemplary system for multi-player gameplay is described below.

Multi-User Gameplay.

Figure 13:
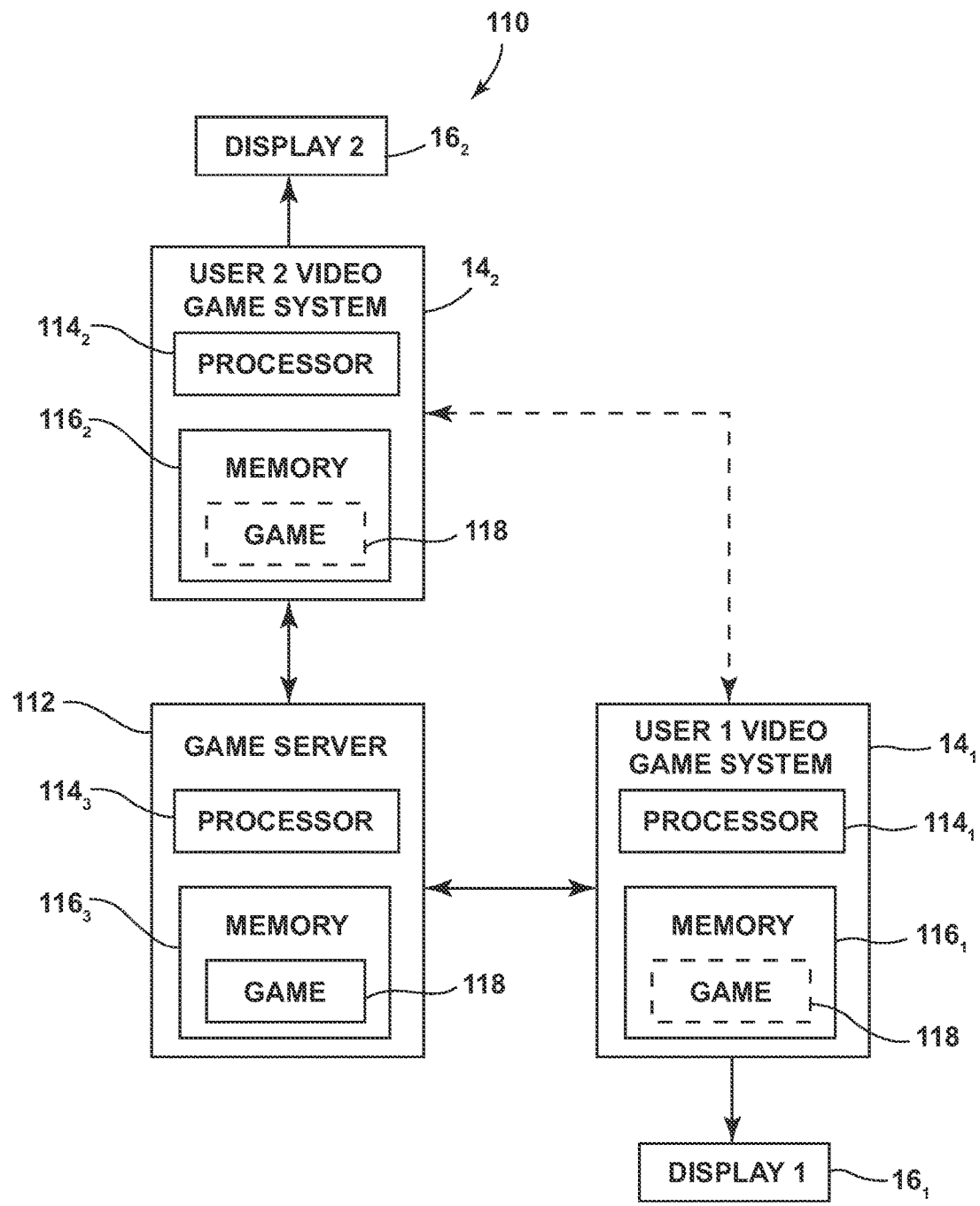
FIG. 13 is a diagrammatic view of an exemplary embodiment of a multi-user system for a video game incorporating live-action combat.

FIG. 13 is a diagrammatic view of a system 110 for multi-player gameplay of a video game incorporating live-action combat. The system 110 may include a first user video game system $14_1$, a second user video game system $14_2$, and a game server 112.

The multi-player system 110 will be described with reference to an embodiment in which a first set of one or more users ("user 1") plays a game through a first video game system $14_1$ and with a first display $16_1$ and a second set of one or more users ("user 2") plays the game through a second video game system $14_2$ and with a second display $16_2$. It should be understood, however, that some or all of the elements of multi-player gameplay described herein may be performed with multiple users on a single video game system 14 and/or a single display 16. Furthermore, two users or three or more users may be included in various embodiments of the system 110. Thus, description below of separate video game systems 14 for two different users is exemplary only and is not limiting except as explicitly set forth in the claims.

Each video game system 14 may include some or all aspects of the functionality of the video game system 14 shown in and described with respect to FIG. 1 and may be provided with and/or in electronic communication with one or more other devices or components that are not shown in FIG. 8, such as projectiles 22 (see FIGS. 1-3), projectile targets 20 (see FIG. 1), hand-worn projectile discharge apparatus 42a, 42b (see FIGS. 3, 11), automated projectile apparatus 26 (see FIG. 1), dummies 80 (see FIG. 6), controllers 60 (see FIG. 4), helmets 70a, 70b (see FIGS. 5, 7A, 7B), other user-wearable apparatus 180, 200, 220 (see FIGS. 8A-10B) cameras 18 (see FIG. 1), and/or other devices and components.

The video game systems $14_1$, $14_2$ may include respective processors $114_1$, $114_2$ and respective computer-readable memories $116_1$, $116_2$ and may be in electronic communication with a respective display $16_1$, $16_2$. Each video game system 14 may thus be configured to provide a game 118 for a respective user or users. The memory 116 of each video game system 14 may be configured to store instructions, and the processor 114 may be configured to execute those instructions. When executed, the instructions stored in the memory 116 may comprise one or more steps, tasks, or methods illustrated and/or described herein.

The game server 112 may include a processor $114_3$ and a computer-readable memory $116_3$, in an embodiment. The memory $116_3$ may be configured to store instructions, and the processor $114_3$ may be configured to execute those instructions. When executed, the instructions stored in the memory $116_3$ may comprise one or more steps, tasks, or methods illustrated and/or described herein.

The memory 116 of one or more of the user 1 video game system $14_1$, the user 2 video game system $14_2$, and the game server 112 may be or may include any volatile or non-volatile computer-readable storage device. For example but without limitation, the memory 116 of one or more of the user 1 video game system $14_1$, the user 2 video game system $14_2$, and the game server 112 may be or may include a hard-disk drive (HDD), FLASH memory, read-only memory (ROM), random access memory (RAM), electrically-erasable programmable ROM (EEPROM), compact disk (CD), digital video disk (DVD), and/or another memory type. The processor 114 of one or more of the user 1 video game system $14_1$, the user 2 video game system $14_2$, and the game server 112 may be any type of processor.

One or more of the user 1 game system $14_1$, the user 2 game system $14_2$, and the game server 112 may include another type of processing apparatus in addition to or instead of a processor 114 and memory 116. For example, but without limitation, one or more of the user 1 video game system $14_1$, the user 2 video game system $14_2$, and the game server 112 may include a field-programmable gate array (FPGA), application-specific integrated circuit (ASIC), programmable logic device (PLD), and/or another type of processing device.

One or more games 118 may be stored in the memory 116 of one or more of the user 1 video game system $14_1$, the user 2 video game system $14_2$, and the game server 112. In an embodiment, a common game 118 (i.e., separate copies of a common software application). As a result, multiple users (e.g., user 1 and user 2) may play a common game 118 through electronic communication of multiple video game systems 14 with each other and/or through electronic communication of one or more of the video game systems 14 with the game server 112.

The game server 112 may provide the game 118 in one or more forms for one or more video game systems 14. For example, the game server 112 may provide a file that may be downloaded to a video game system 14. Thus, in an embodiment, a video game system 14 may execute one or more portions of the game 118 independent of the game server 112. Additionally or alternatively, the game server 112 may host game content that may be accessed by a video game system 14 during gameplay. In an embodiment, the game server 112 may provide one or more libraries for a game 118 that may be accessed by a video game system 14, may provide authentication enabling a user to play the game 118, etc. In a further embodiment, the game server 112 may supply most or all of the content of a game 118, with a video game system 14 acting as a terminal through which a user may access content on the game server 112.

Two or more of the user 1 video game system $14_1$, user 2 video game system $14_2$, and game server 112 may be in electronic communication with each other. For example, the user 1 video game system $14_1$, user 2 video game system $14_2$, and game server 112 may communicate over the Internet, or may be part of a single local area network (LAN) or wide area network (WAN). The user 1 video game system $14_1$, user 2 video game system $14_2$, and game server 112 may cooperatively provide a game 118 that may be played by multiple users (e.g., user 1 on the user 1 video game system $14_1$ and user 2 on the user 2 video game system $14_2$) that incorporates gameplay elements as described herein.

Numerous different multiplayer gameplay aspects may be incorporated into a game according to the present disclosure. For example, user 1 and user 2 may both direct display-centric action, cooperatively or competitively, in a common game environment. Additionally or alternatively, one or both of user 1 and user 2 may be prompted to perform a live-action combat action, such as firing a projectile, moving to a movement target, manually striking a target, etc. The live-action combat activity of a user may be assessed and scored, in an embodiment, and that score may affect the display-centric and/or live-action combat elements of the game for user 1 and/or user 2. For example, both user 1 and user 2 may be prompted to fire a projectile at a target, and the user with the more accurate projectile may be given an advantage in the display-centric portion of the game and/or a subsequent live action combat portion of the game. Additionally or alternatively, user 1 and user 2 may partake in both display-centric and live-action combat gameplay elements and each user's performance in both display-centric and live-action combat gameplay elements may be scored or otherwise assessed to determine a winner.

In another example of multiplayer gameplay, one user may control an automated projectile apparatus 26 (see FIG. 1) to fire projectiles at the other user. For example, referring to FIGS. 1 and 13, in the embodiment illustrated in FIG. 13 in which user 1 plays a game through a first video game system $14_1$ and user 2 plays the same game through a different video game system $14_2$ (e.g., where user 1 and user 2 are in separate locations), user 2 may control the automated projectile apparatus 26 associated with the user 1 video game system $14_1$ to fire projectiles 22 at user 1, and user 1 may control the automated projectile apparatus 26 associated with the user 2 video game system $14_2$ to fire projectiles 22 at user 2. For example, images captured by the camera 18 associated with the user 1 video game system $14_1$ may be provided to the user 2 video game system $14_2$ for display for user 2, based on which images user 2 may aim the automated projectile apparatus 26 associated with the user 1 video game system $14_1$, and vice-versa. In an embodiment, user 2 may be awarded points in the game for each projectile 22 fired from the automated projectile apparatus 26 that hits user 1, and vice-versa. Numerous other multi-player aspects may be provided in the system, including live-action combat gameplay elements.

The systems, devices, and apparatuses of FIGS. 1-13 may be used in numerous different games. Such games may be considered to comprise one or more methods having steps performed by one or more of a video game system 14 (e.g., wherein the steps of the method are embodied as instructions in a memory executed by a processor), a game server 112 (e.g., wherein the steps of the method are embodied as instructions in a memory executed by a processor), and a user. Such methods may be embodied in software (i.e., instructions on a computer-readable memory). Two exemplary methods will be described below. It should be understood, however, that the present disclosure is not limited to such methods and that a wide variety of games may be operated according to the present disclosure.

Method of Operating a Game: Incorporating Live-Action Projectile Firing by User.

Figure 14:
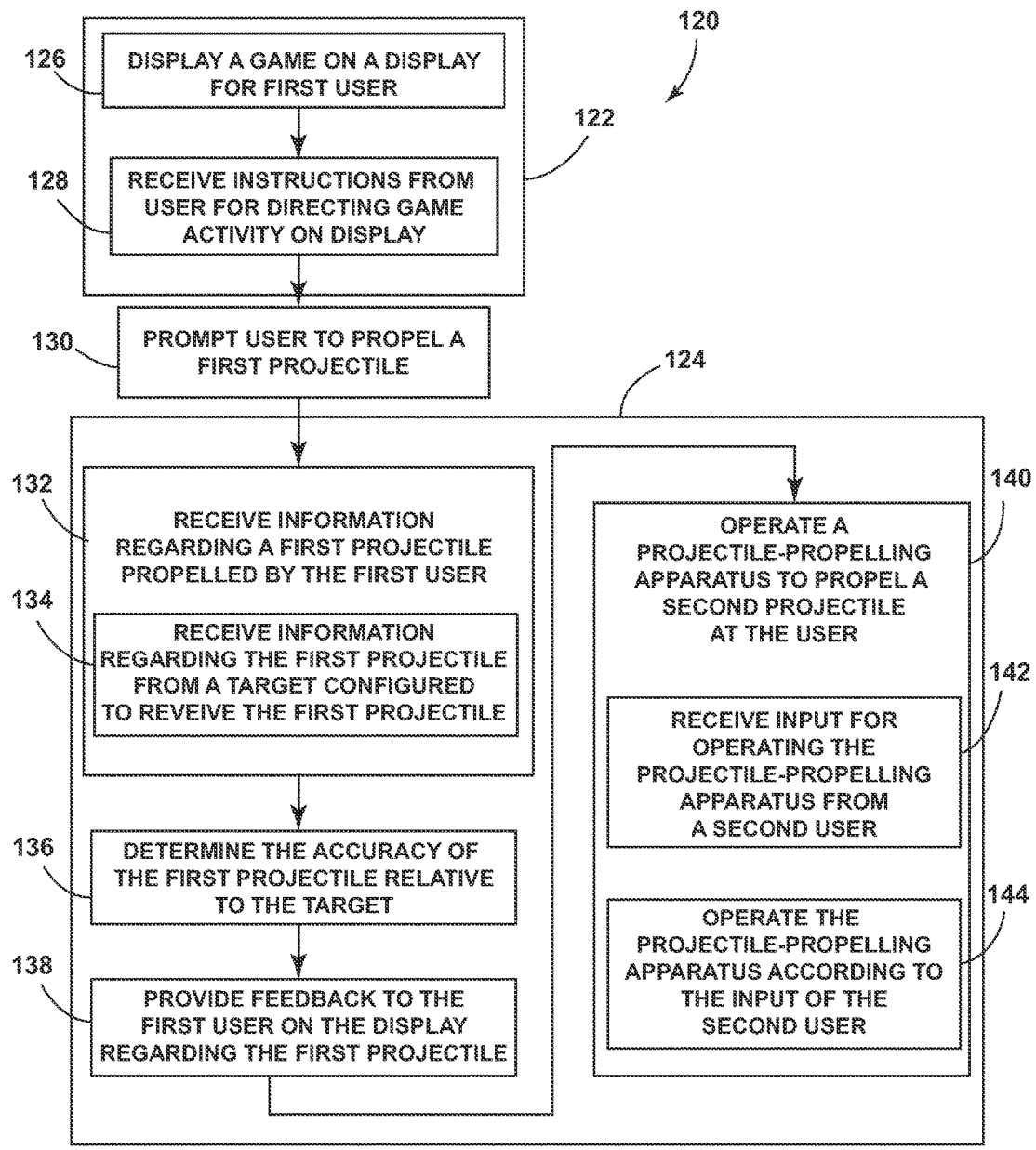
FIG. 14 is a flow chart illustrating an exemplary embodiment of a method of operating a video game incorporating live-action combat.

FIG. 14 is a flowchart illustrating an exemplary embodiment of a method 120 of operating a game incorporating live-action combat elements, including an element of user projectile firing and an element of system projectile firing. The method 120 may generally include two segments: a display-centric segment 122 and a live-action combat segment 124. The segments 122, 124 may be operated separately in time, in an embodiment, or one or more portions of the segments 122, 124 may be operated simultaneously.

The display-centric segment 122 of the game may begin with a step 126 of providing a game on a display for a first user. The game may be of any appropriate type and may be played with any appropriate devices and components such as, for example only, the devices and components illustrated in and described with respect to FIGS. 1-13.

The display-centric segment 122 of the game may further include a step 128 of receiving instructions from the user for directing display-centric game activity and directing the display-centric action according to those instructions. Such instructions may be received, for example, from a handheld controller manipulated by the user, from voice commands by the user, from movement-based commands by the user, etc.

A transition from the display-centric segment 122 to the live-action combat segment 124 may be initiated by a step 130 of prompting the user to propel a first projectile. That is, the user may be prompted to fire a projectile at one or more projectile targets or other objects. Such a prompt may include, for example but without limitation, a visual prompt on the display or a projectile target and/or an audible prompt from the display or a projectile target. In an embodiment, the prompting step 130 may be considered a part of the display-centric segment 122. In another embodiment, the prompting step 130 may be considered a part of the live-action combat segment 124.

In an embodiment, the prompt may specify one or more targets at which the user is intended to fire one or more projectiles. For example, the prompt may specify that a user is intended to fire one or more projectiles at a specific projectile target, at a dummy, at the display, or at a specific portion of one or more of such targets. In another embodiment, the prompt may simply prompt the user to fire a projectile at one or more of the available targets known to the user to be capable of recording an impact or proximity of a projectile.

In response to the prompt, a user may propel (e.g., fire, throw, kick, etc.) one or more projectiles at a designated target. As noted above with respect to FIGS. 1, 2, and 12, one or more of the projectiles propelled by the user may include features enabling the projectile to be tracked.

Referring again to FIG. 14, the live-action combat segment 124 of the game may include a step 132 that includes receiving information regarding a first projectile propelled by the first user. The information may be regarding the speed with which the projectile was fired following the prompt, the accuracy of the projectile relative to a target, the distance travelled by the projectile, and/or other information.

In an embodiment, the step 132 that includes receiving information may include a sub-step 134 of receiving information regarding the first projectile from a target configured to receive the first projectile. For example, information regarding the first projectile may be received from a device having one or more sensors or other features configured to detect or track a projectile. For example, a projectile target 20 as illustrated in and described with respect to FIG. 1 may sense or detect one or more projectiles 22 (e.g., a projectile as illustrated in and described with respect to FIGS. 1 and 2) and provide information regarding the one or more projectiles 22. Additionally or alternatively, information for tracking a projectile 22 may be received from a camera 18, from the projectile 22, and/or from another device.

Referring again to FIG. 14, the live-action combat segment 124 may further include a step 136 that includes determining the accuracy of the first projectile relative to the target. The determination may be made according to information received in the receiving information step, in an embodiment. Instead of or in addition to determining the accuracy of the projectile, other determinations and assessments may be made, including the speed with which the projectile was fired following a prompt and/or the distance travelled by the projectile, for example only.

The live-action combat segment 124 may further include a step 138 that includes providing feedback to the first user on the display regarding the first projectile. Such feedback may include, for example only, a score, an image, a video, and/or some other feedback. Feedback may also be provided through one or more lights, speakers, etc. associated with the intended target of a projectile and/or through some other component integrated into or associated with the video game system used by the user (e.g., through a controller, helmet, etc.).

The steps of receiving information regarding a projectile 132, determining the accuracy of the projectile 136, and providing feedback regarding the projectile 138 may be considered portions of a live-action combat element involving user-fired projectiles. The steps 132, 136, 138 may be performed numerous times for numerous projectiles, in an embodiment. Furthermore, as noted above, the steps 132, 136, 138 may be performed as a temporally-separate game portion, or may be performed simultaneously with other game elements, including display-centric elements and other live-action combat elements.

The live-action combat segment 124 may further include a step 140 that includes operating a projectile-propelling apparatus (such as, for example only, the automated projectile apparatus 26 illustrated in and described with respect to FIG. 1) to propel a second projectile or projectiles at the user. For example, in an embodiment, the projectile-propelling apparatus may be operated by a video game system automatically (e.g., may be aimed according to a logic routine or artificial intelligence). The video game system may aim the projectile-propelling apparatus at a user according to images received from a camera, in an embodiment. The video game system may fire projectiles from the projectile-propelling apparatus in an effort to hit the user with one or more projectiles.

In an embodiment, the step 140 of operating a projectile-propelling apparatus may include substeps directed to providing a second user with control of the projectile-propelling apparatus (e.g., as described in conjunction with FIG. 13). Thus, a first substep 142 may include receiving input for operating the projectile-propelling apparatus from a second user. Such input may be received, in an embodiment, from a second user playing the game remotely with a second video game system, or from a second user playing the game on the same video game system as the first user, in another embodiment.

A further substep 144 may include operating the projectile-propelling apparatus according to the input of the second user. Thus, in an embodiment, a video game system may receive instructions for aiming a projectile-propelling apparatus from a user and firing projectiles and translate those instructions into commands for aiming the projectile-propelling apparatus and firing projectiles from the projectile-propelling apparatus.

The step 140 of operating a projectile-propelling apparatus (including substeps 142, 144) may be considered a portion of a live-action combat element involving system-fired projectiles. The step 140 and substeps 142, 144 may be performed numerous times for numerous projectiles, in an embodiment. Furthermore, as noted above, the step 140 and substeps 142, 144 may be performed as a temporally-separate game portion, or may be performed simultaneously with other game elements, including display-centric elements and live-action combat elements.

Method of Operating a Game: Incorporating Live-Action Manual Strikes by User.

Figure 15:
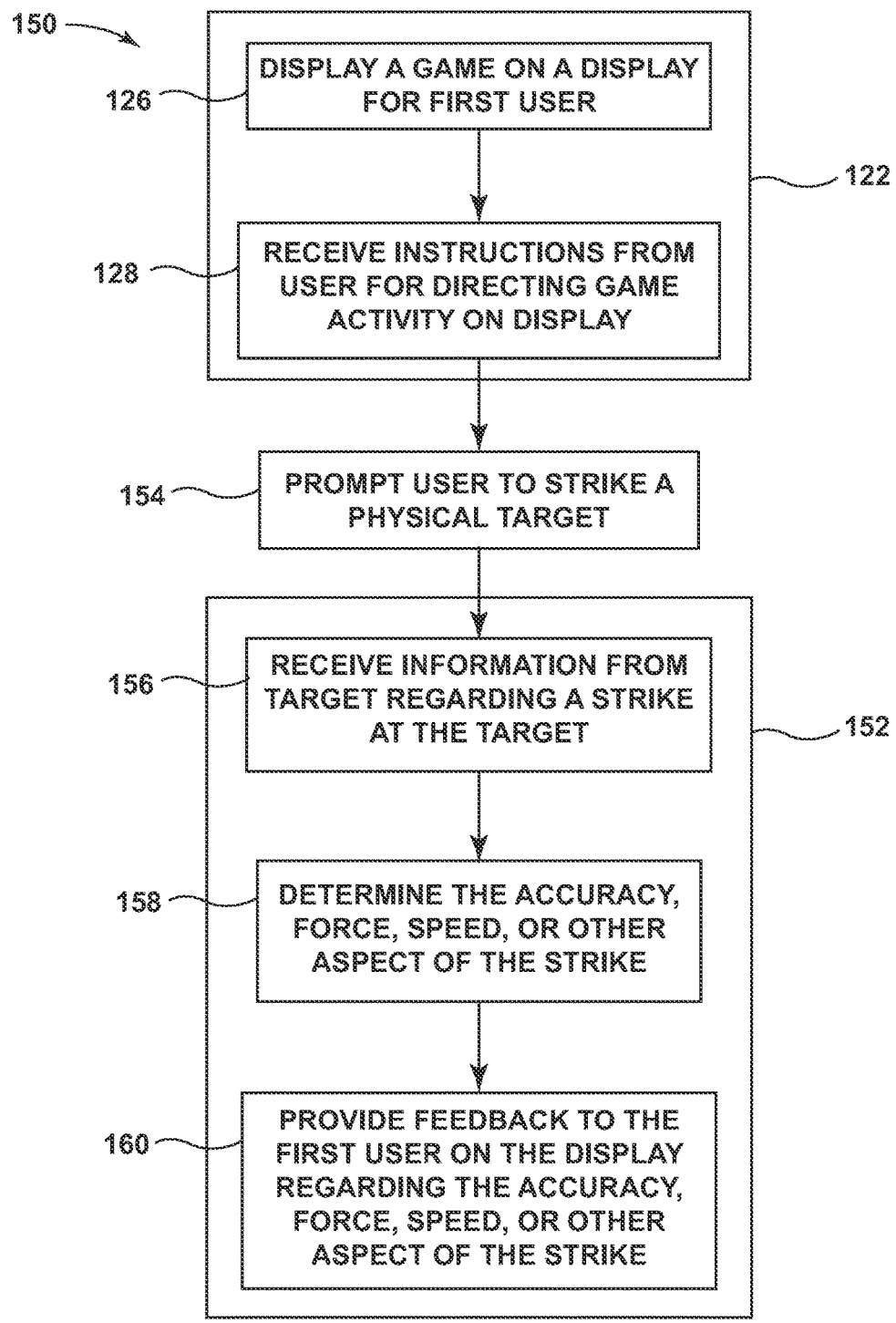
FIG. 15 is a flow chart illustrating an exemplary embodiment of a method of operating a video game incorporating live-action combat.

FIG. 15 is a flowchart illustrating an exemplary embodiment of a method 150 of operating a game incorporating live-action combat elements, including an element of user target manual striking. The method 150 may generally include two segments: a display-centric segment 122 and a live-action combat segment 152. The segments 122, 152 may be operated separately in time, in an embodiment, or one or more portions of the segments 122, 152 may be operated simultaneously.

The display-centric segment 122 of the game may begin with a step 126 of providing a game on a display for a first user. The game may be of any appropriate type and may be played with any appropriate devices and components such as, but not limited to, the devices and components illustrated in and described with respect to FIGS. 1-13.

The display-centric segment 122 of the game may further include a step 128 of receiving instructions from the user for directing game activity on the display and directing the action according to those instructions. Such instructions may be received, for example, from a handheld controller manipulated by the user, from voice commands by the user, from movement-based commands by the user, etc.

A transition between the display-centric segment 122 and the live-action combat segment 152 may be initiated by a step 154 of prompting the user to strike a physical target. In an embodiment, the prompt may be for the user to manually strike a target. In another embodiment, the prompt may be for the user to strike a target with a projectile, in which embodiment the live-action combat segment may proceed as set forth in the method 120 of FIG. 14. A prompt may include, for example but without limitation, a visual prompt on the display or the target or an audible prompt from the display or the target. In an embodiment, the prompting step may be considered a part of the display-centric segment. In another embodiment, the prompting step may be considered a part of the live-action combat segment.

With continued reference to FIG. 15, in an embodiment, the prompt may prompt the user to manually strike a dummy, such as the dummy 80 illustrated in and described with respect to FIG. 6. The method 150 will hereinafter be described with reference to an embodiment in which the user is prompted to strike such a dummy 80. It should be understood that such description is for ease of reference only, and is not limiting except as explicitly set forth in the claims. Thus, a user may be prompted to strike additional or alternative targets, and further steps in the method may be adapted to such additional or alternative targets.

In response to the prompt, a user may manually strike a designated target or a designated portion of a target. For example, in an embodiment, a user may be prompted to strike the head 88 of a dummy 80, a torso 90 of the dummy 80, a portion of the torso 90 of the dummy 80, and/or some other portion of the dummy 80. Still further, in an embodiment, the user may be prompted to perform a series of manual strikes on designated portions of a target. For example, the user may be prompted to punch a first portion of the target, to kick another portion of the target, and then to grapple the target.

Referring again to FIG. 15, the live-action combat segment 152 of the method 150 may include a step 156 that includes receiving information regarding a one or more strikes by the user from the target. Such information may include, for example, impact information, proximity information, contact information, and the like, from one or more sensors integrated into or associated with the target. Additionally or alternatively, information regarding one or more strikes may be received from sources other than the target such as, for example, from a camera.

The live-action combat segment of the method may further include a step 158 that includes assessing the accuracy, force, speed, or other aspect of one or more manual strikes from the user. Such assessments may be made based on accuracy information, force information, and/or speed information (e.g., reaction time, velocity) received in the receiving information step 156. Physical attributes of the user, such as the user's weight or height, may also be received and may be factored into the assessment of the user's manual strikes. For example, a lighter-in-weight user may receive more points for a given manual strike force than would a heavier-in-weight user.

The live-action combat segment 152 of the method 150 may further include a step 160 that includes providing feedback to the first user on the display regarding the accuracy, force, speed, and/or other aspect of a user strike. Such feedback may include, for example only, a score, an image, a video, and/or some other feedback. Feedback may also be provided through the target and/or through some other component integrated into or associated with the video game system used by the user (e.g., through a controller, helmet, etc.).

The methods 120, 150 advantageously enables a game having both display-centric and live-action combat segments. Such a game may improve on known games in numerous ways. First, traditional display-centric games may be improved upon by allowing and/or requiring the player to move to fire projectiles, to manually strike a target, to dodge projectiles, etc., providing additional excitement and encouraging exercise. Second, other games that may involve live-action elements may be improved upon because a game according to the method may incorporate elements of popular known display-centric games, thus providing a game that may include familiar display-centric elements. Third, a game according to the method may test both a user's abilities to direct on-display action with a controller, for example, and a user's physical abilities to perform live-action combat activities. Fourth, a user's display-centric gameplay skills and live-action combat skills may be assessed and scored, providing a more comprehensive test of a user's skills than known games.

The steps of the methods 120, 150 may be adapted to additional or alternative live-action combat elements, in embodiments. For example, the live-action combat segments of user-fired projectiles, of system-fired projectiles, and of user manual strikes may be combined, replaced or supplemented with live-action combat segments of movements to targets (e.g., as described in conjunction with FIG. 1), users firing projectiles at each other in the same room (e.g., from user-manipulated apparatus, such as the apparatus of FIG. 3, for example only), and/or other live-action combat elements.

The methods 120, 150 have been described as comprising a certain set of steps in a particular sequence, but such steps and sequences are not limiting except as explicitly set forth in the claims or as logically dictated. Thus, steps of the methods may be removed, altered, or added, and may be performed in an order different from that described herein, in embodiments.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional.

Although numerous embodiments of this invention have been described above with a certain degree of particularity, those skilled in the art could make numerous alterations to the disclosed embodiments without departing from the spirit or scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure. As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system comprising:
   a physical target; and
   software configured to be executed by a video game computing system to:
   display a display-centric portion of a multiplayer video game on a display for a first user, wherein the display is different from the physical target;
   receive user instructions from the first user for directing activity in the display-centric portion of the video game;
   direct activity in the display-centric portion of the video game on the display according to the user instructions from the first user;
   prompt the first user to strike the physical target;
   receive information from the target regarding a strike at the physical target by the first user;
   receive information regarding a strike by a second user at the physical target or at a second target that is different from the physical target, the second user involved in the multiplayer video game;
   compare the strike of the first user to the strike of the second user; and
   provide a gameplay advantage in the display-centric portion of the video game to the first user or the second user over the other of the first user and the second user according to the comparison.

2. The system of claim 1, wherein the software is configured to be executed by the video game computing system further to:
   determine respective scores for the first user and the second user for the display-centric portion of the video game; and
   determine a winner of the video game based, at least in part, on the respective scores.

3. The system of claim 2, wherein the software is configured to be executed by the video game computing system further to:
   determine respective scores for the first user and the second user for a live combat portion of the video game, the live-combat portion comprising the respective strikes of the first user and the second user;
   wherein determining a winner of the video game is further based, at least in part, on the respective scores for the first user and the second user for the live combat portion of the video game.

4. The system of claim 1, wherein the information regarding the strike by the second user at the physical target or at the second target is received over a network connection.

5. The system of claim 4, wherein the information regarding the strike by the second user at the physical target or at the second target by the second user is received from a game server.

6. The system of claim 1, wherein the software is configured to be executed by the video game computing system further to:
   receive user instructions from the second user for directing activity in the display-centric portion of the video game; and
   direct activity in the display centric portion of the video game on the display according to the user instructions from the second user.

7. The system of claim 6, wherein the software is configured to be executed by the video game computing system further to:
   receive user instructions from the first user for directing activity in the display-centric portion of the video game through a first handheld controller;
   receive user instructions from the second user for directing activity in the display-centric portion of the video game through a second handheld controller.

8. A system comprising:
   a projectile propelling device;
   software configured to be executed by a video game computing system, the video game computing system configured to be in electronic communication with the projectile propelling device, the software configured to be executed by the video game computing system to:
   display a display-centric portion of a multiplayer video game on a display for a first user;

receive user instructions from the first user for directing activity in the display-centric portion of the video game; and direct activity in the display-centric portion of the video game on the display according to the user instructions from the first user;

receive user instructions from a second user for controlling the projectile propelling device; and control the projectile propelling device according to the user instructions from the second user.

9. The system of claim 8, wherein the user instructions from the second user are received over a network connection.

10. The system of claim 8, wherein the user instructions from the second user are received from a hand-held controller operated by the second user.

11. The system of claim 8, wherein the software is configured to be executed by the video game computing system further to:

receive images of the first user captured by a camera associated with the video game computing system; and provide the images for the second user.

12. The system of claim 8, wherein the software is configured to be executed by the video game computing system further to:

determine if a physical projectile fired from the projectile propelling device hits the first user;

award points to the second user in the video game if the physical projectile fired from the projectile propelling device hits the first user.

13. A system comprising:

a physical target;

a projectile propelling device;

software configured to be executed by a video game computing system, the video game computing system configured to be in electronic communication with the projectile propelling device, the software configured to be executed by the video game computing system to:

display a display-centric portion of a multiplayer video game on a display for a first user;

receive user instructions from the first user for directing activity in the display-centric portion of the video game;

direct activity in the display-centric portion of the video game on the display according to the user instructions from the first user;

receive user instructions from a second user for controlling the projectile propelling device, the second user involved in the multiplayer videogame;

control the projectile propelling device according to the user instructions from the second user;

prompt the first user to strike a physical target;

receive information from the target regarding the physical target by the first user;

receive information regarding a target by the second user;

compare the strike of the first user to the strike of the second user; and provide an advantage in the display-centric portion of the video game to the first user or the second user over the other of the first user and the second user according to the comparison.

14. The system of claim 13, wherein the user instructions from the second user are received over a network connection.

15. The system of claim 13, wherein the user instructions from the second user are received from a hand-held controller operated by the second user.

16. The system of claim 13, wherein the software is configured to be executed by the video game computing system further to:

determine respective scores for the first user and the second user for the display-centric portion of the video game; and determine a winner of the video game based, at least in part, on the respective scores.

17. The system of claim 13, wherein the software is configured to be executed by the video game computing system further to:

determine respective scores for the first user and the second user for a live combat portion of the video game, the live-combat portion comprising the respective strikes for the first user and the second user;

wherein determining a winner of the video game is further based, at least in part, on the respective scores for the first user and the second user for the live combat portion of the video game.

18. The system of claim 13, wherein the software is configured to be executed by the video game computing system further to:

receive images of the first user captured by a camera associated with the video game computing system; and provide the images for the second user.

19. The new system of claim 13, wherein the software is configured to be executed by the video game computing system further to:

determine if a physical projectile fired from the projectile propelling device hits the first user;

award points to the second user in the video game if the physical projectile fired from the projectile propelling device hits the first user.

20. The system of claim 17, wherein the projectile propelling device is a first projectile propelling device, wherein the software is configured to be executed by the video computing system further to:

receive user instructions from the first user for controlling a second projectile propelling device associated with the second user.

* * * * *